(12) United States Patent
Zargarian et al.

(10) Patent No.: US 12,375,459 B2
(45) Date of Patent: *Jul. 29, 2025

(54) SYSTEMS, METHODS, AND APPLICATIONS FOR TRANSCODING DATA INTO MEDIA FILES

(71) Applicant: Arebus LLC, Glendale, CA (US)

(72) Inventors: Edwin Zargarian, Arlington, MA (US); Eric Scott Bravick, Traverse City, MI (US); Sean Montgomery, Woodland Hills, CA (US); Andrew Rolfe, Glendale, CA (US); Hovannes Demirtshyan, Yerevan (AM)

(73) Assignee: Arebus LLC, Glendale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/438,817

(22) Filed: Feb. 12, 2024

(65) Prior Publication Data
US 2024/0214359 A1   Jun. 27, 2024

Related U.S. Application Data

(63) Continuation-in-part of application No. 17/534,442, filed on Nov. 23, 2021, now Pat. No. 11,929,993,
(Continued)

(51) Int. Cl.
*H04L 29/06* (2006.01)
*G06F 16/11* (2019.01)
(Continued)

(52) U.S. Cl.
CPC ........ *H04L 63/0428* (2013.01); *G06F 16/116* (2019.01); *G06F 21/602* (2013.01);
(Continued)

(58) Field of Classification Search
CPC .. G06F 21/6209; G06F 21/602; G06F 16/116; H04L 63/101; H04L 63/0428; G06T 7/90
See application file for complete search history.

(56) References Cited

U.S. PATENT DOCUMENTS

| | | |
|---|---|---|
| 5,497,463 A | 3/1996 | Stein et al. |
| 7,113,523 B1 | 9/2006 | Kubota et al. |

(Continued)

OTHER PUBLICATIONS

U.S. Appl. No. 15/043,737, Non-Final Office Action, Mailed on Feb. 23, 2018, 29 pages.
(Continued)

*Primary Examiner* — Vance M Little
(74) *Attorney, Agent, or Firm* — Kilpatrick Townsend & Stockton LLP

(57) ABSTRACT

A computer-implemented method that comprises determining clear data from one or more input files, generating a second file, which is user-recognizable as an audio and/or visual file, by transcoding the clear data into transcoded data using at least one encoding domain, wherein the transcoded data within the second file is no longer user-recognizable as the clear data. Transcoding clear data comprises: determining presentation properties for generating the second file according to presentation elements; determining a mapping associated with the at least one encoding domain; generating the presentation elements representing the clear data values of the clear data; and generating the transcoded data of the second file by combining, based on the presentation properties, the presentation elements such that, upon a presentation of the second file at a user interface, the transcoded data is audibly and/or visually user-recognizable based on the presentation properties.

18 Claims, 31 Drawing Sheets

Related U.S. Application Data which is a continuation of application No. 16/263,160, filed on Jan. 31, 2019, now Pat. No. 11,582,202, which is a continuation-in-part of application No. 15/043,737, filed on Feb. 15, 2016, now Pat. No. 10,229,250.

(60) Provisional application No. 62/116,682, filed on Feb. 16, 2015, provisional application No. 62/626,540, filed on Feb. 5, 2018.

(51) Int. Cl.
  *G06F 21/60* (2013.01)
  *G06F 21/62* (2013.01)
  *G06T 7/90* (2017.01)
  *H04L 9/40* (2022.01)

(52) U.S. Cl.
  CPC ............ *G06F 21/6209* (2013.01); *G06T 7/90* (2017.01); *H04L 63/101* (2013.01)

(56) References Cited

U.S. PATENT DOCUMENTS

| | | | |
|---|---|---|---|
| 9,111,164 | B1 | 8/2015 | Anderton et al. |
| 9,548,082 | B1 | 1/2017 | Bussieres |
| 10,229,250 | B2 | 3/2019 | Zargarian et al. |
| 11,929,993 | B2 | 3/2024 | Zargarian et al. |
| 2001/0039495 | A1 | 11/2001 | Chin et al. |
| 2002/0001277 | A1 | 1/2002 | Thomas |
| 2002/0090000 | A1 | 7/2002 | Luddy |
| 2002/0136426 | A1 | 9/2002 | Davis et al. |
| 2002/0162103 | A1 | 10/2002 | Boudreault et al. |
| 2002/0181025 | A1 | 12/2002 | Yamaguchi |
| 2003/0028553 | A1 | 2/2003 | Kondo |
| 2004/0264713 | A1 | 12/2004 | Grzesek |
| 2007/0180062 | A1 | 8/2007 | Southerland et al. |
| 2008/0246983 | A1 | 10/2008 | Silverbrook et al. |
| 2012/0287237 | A1 | 11/2012 | Piccinelli et al. |
| 2013/0073854 | A1 | 3/2013 | Patti et al. |
| 2013/0114744 | A1 | 5/2013 | Mutton |
| 2013/0169801 | A1 | 7/2013 | Martin et al. |
| 2013/0305383 | A1 | 11/2013 | Garralda et al. |
| 2014/0019767 | A1 | 1/2014 | Jarnikov |
| 2014/0122889 | A1 | 5/2014 | Freund et al. |
| 2014/0173638 | A1 | 6/2014 | Anderson |
| 2014/0333948 | A1 | 11/2014 | Hashimoto |
| 2016/0239642 | A1 | 8/2016 | Zargarian et al. |

OTHER PUBLICATIONS

U.S. Appl. No. 15/043,737 , Notice of Allowance, Mailed on Oct. 24, 2018, 18 pages.

U.S. Appl. No. 15/043,737 , Response to Non-Final Office Action, Mailed on Jul. 23, 2018, 15 pages.

U.S. Appl. No. 16/263,160 , Non-Final Office Action, Mailed on Dec. 14, 2021, 16 pages.

U.S. Appl. No. 16/263,160 , Notice of Allowance, Mailed on Oct. 5, 2022, 9 pages.

U.S. Appl. No. 17/534,442 , Non-Final Office Action, Mailed on Apr. 11, 2023, 17 pages.

U.S. Appl. No. 17/534,442 , Notice of Allowance, Mailed on Oct. 30, 2023, 9 pages.

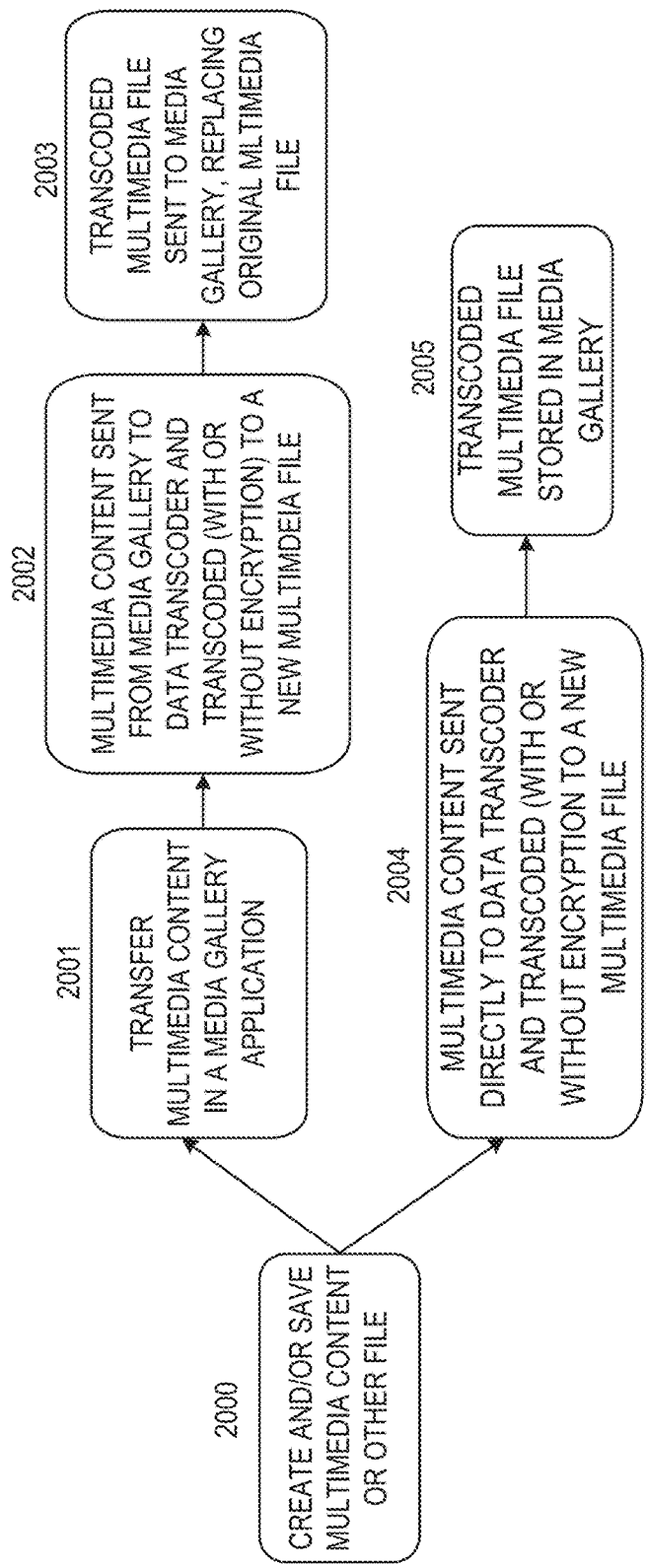
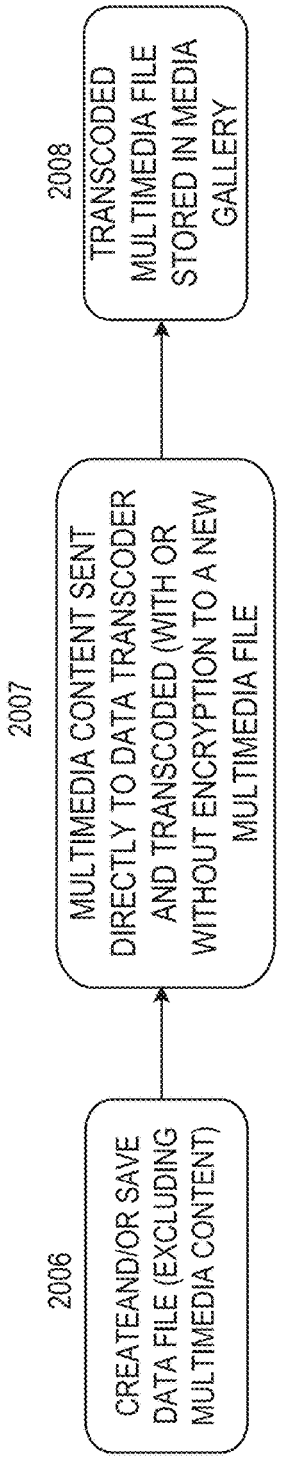
Figure 20A
Figure 20B

SYSTEMS, METHODS, AND APPLICATIONS FOR TRANSCODING DATA INTO MEDIA FILES

CROSS REFERENCE TO RELATED APPLICATIONS

This application is a continuation-in-part of U.S. patent application Ser. No. 17/534,442, filed Nov. 23, 2021, which is a continuation of U.S. Pat. No. 11,582,202, filed Jan. 31, 2019, which is a continuation-in-part of U.S. Pat. No. 10,229,250, filed Feb. 15, 2016, which claims priority to U.S. Provisional Application No. 62/116,682, filed Feb. 16, 2015. U.S. Pat. No. 11,582,202 (referenced above) also claims priority to U.S. Provisional Application No. 62/626,540, filed Feb. 5, 2018, the contents of such applications being incorporated herein by reference in their entirety.

FIELD

The application concerns a system, method and application for electronic data processing and exchange, and more particularly, to a system, method and application for sending data from one end user to one or more end user(s) using a media-based system.

BACKGROUND

Electronic messaging (e.g., e-mail, text) and transfer of data (e.g., images, video, documents) (collectively referred to hereafter as "data") have become a primary means of communication for a large number of organizations, businesses, and individuals. Data exists in a plethora of file formats (e.g., portable document format (pdf), joint photographic experts group (jpeg), PowerPoint (ppt), executable file (exe), etc.) which are defined as standard methods that information is encoded for storage in a computer file. The enormous variety and application of these file formats allow for specific functionality and purpose built into each piece of data.

Currently, popular social media transmission methods, such as Facebook®, Twitter®, or Instagram support limited file formats for the transmission of data. Specifically, social media applications support only text, image, and video file formats, thus limiting the type of data that may be transmitted through social media applications. Similar to the social media methods, some business applications are also built to only store and send certain multimedia file formats (photos, videos, audio files, etc.), making it complex to add encryption to the workflow.

Furthermore, current data transmission applications are an inherently insecure means of communication given that all messages, images, documents, or other media sent between senders and recipients are transmitted over networks and rely upon the security strength of the applications and networks facilitating the transmission. This problem is exacerbated by the fact that privacy controls are in the hands of third-party application and services providers. Hence, when an email or file is sent, or a picture posted/stored online, the user has little-to-no control over that content above what the online service is offering. In some cases, the online services "own" your content and do not offer any way to permanently delete the images or content once they are transmitted to the online services. In addition to owning user content, this user content is not encrypted when stored on servers of these online services (e.g., Facebook, medical applications, etc.). Thus, if the server is hacked, then user content (e.g., images) can easily be downloaded and viewed since the content is not encrypted. As an analogy, the modern equivalent of sending data is sending a postcard, which allows anyone who comes in contact with the postcard to read/copy/retransmit the context without any recourse.

For the longest time, this fact has not deterred a large portion of data users to continue using conventional means for transmitting data as a conduit for sensitive, confidential material. While some users, and/or the organizations they belong to, have begun using encryption as a means to secure the transfer of data, the vast majority of users must continue to transfer sensitive information using regular, unencrypted methods. However, the online and social market has matured to a point where many people are beginning to understand the ramifications of the lack of privacy controls online. Many public figures, including many celebrities, have had very sensitive pictures and documents exposed to the public via online hacking and other illegal methods. In other situations, previously sent text messages and emails are used in legal court proceedings to implicate individuals.

In business use cases, many professional services firms (such as accounting, medical, legal, and financial firms) communicate with their clients, and internally with others in their company, via unsecured email. The unsecured documents and materials (e.g., images, text documents, etc.) communicated are generally sensitive in nature and can lead to fraud and identity theft, causing significant financial loss and personal angst. In one example, medical patients now send photos and videos to their doctors through online services. Although the transmission of these files (e.g., photos and videos) may be encrypted, these files are at times stored unencrypted on the computers/servers at the hospital. In another example, businesses may communicate private documents (e.g., financial information, intellectual property, etc.) to and from clients, while also storing these private documents on their servers. These private documents are protected by email encryption during transmission, and by firewalls when stored on the servers. However, these private documents are not themselves encrypted. Thus, if the email account or file server is hacked, these private documents can easily be downloaded and viewed by the hacker.

BRIEF DESCRIPTION OF THE DRAWINGS

FIGS. 20A and 20B are flowchart diagrams of an example process for generating transcoded multimedia content.

Figure 1:
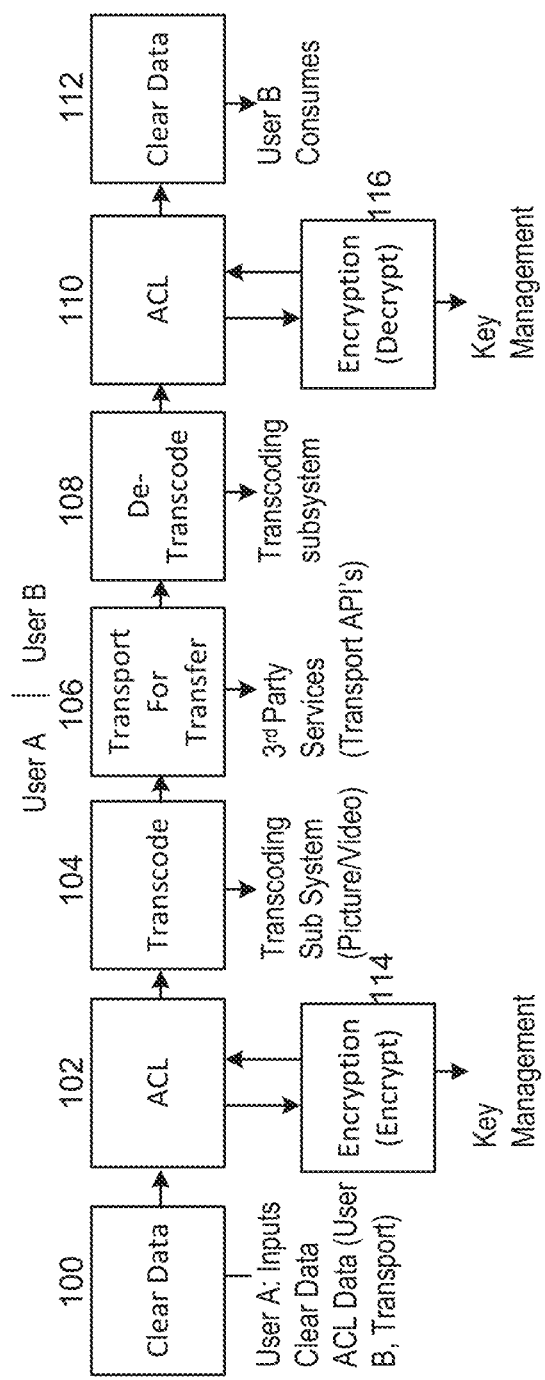
FIG. 1 is an exemplary flowchart depicting transcoding/detranscoding between a single transmitter device and a single recipient device, according to an embodiment or portion of an example embodiment.

The drawings are merely schematic representations, not intended to portray specific parameters of the invention. The drawings are intended to depict typical embodiments, and therefore should not be considered as limiting the scope of the claims.

SUMMARY

In one embodiment, the system includes a data transcoding device including a memory device for storing clear data containing private information, and a processor configured as a data transcoder. The processor is configured to create packets of the clear data, prepare the packets for transcoding the clear data into a multimedia data file, by determining properties of the multimedia file based on parameters of the clear data. The processor configured to generate the multimedia file by transcoding the clear data based on the determined properties.

In another embodiment, the system includes a data detranscoding device including a memory device for storing a multimedia file, and a processor configured as a data detranscoder. The processor is configured to extract multimedia data from the multimedia file, detect a packet of data within the extracted multimedia data, the indecipherable packet of data including multimedia data that represents transcoded clear data, and detranscode the packet of data to determine the clear data.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

There is a need for an elegant solution capable of securely transmitting data from any file format via online service and applications (e.g., social media platforms). There is also a need for an elegant solution capable of securely storing data from any file format either locally in memory or on a remote server (e.g., cloud). In addition, there exists a need for a data transcoding system, method and application capable of simple integration with existing/dominant email, social, online/offline storage, and web communication protocols.

The described embodiments (also referred to as "Arebus") disclose a novel method, system and application for transcoding any form of electronic data (hereafter referred to as "Clear Data") into a multimedia file format (e.g., Arebus generates an image, video, or music file based on the Clear Data) that is indecipherable to the human eye/ear (e.g., looks like or sounds like random noise rather than Clear Data information) and only becomes decipherable as the original Clear Data after detranscoding. As multimedia files have become the near-universal file format for transmission of data across social media platforms, the described embodiments create a method, system, and application for the transfer of Clear Data through platforms that are not intended to, are limited to, or do not support the transmission of all file types. This method of transcoding allows applications/services to send and/or store multimedia files without major change to the way the application operates. Basically, output application data files may be transcoded without changing the manner in which the application outputs files (e.g., the transcoding is an add-on step to the output/input of the application). This is especially useful for applications such as social media services that are limited to transmitting multimedia files (i.e. they cannot transmit other types of files).

In addition to transcoding, the described embodiments may incorporate an encryption element into the novel method, system, and application, wherein the encryption element separates data from the social media or online services upon which the data is sent or stored. An element of the example method includes encrypting the Clear Data (including messages) prior to the data being sent/stored via the internet/web. For example, once the encrypted data is transcoded into a multimedia file format (e.g., the encrypted Clear Data is used to generate a multimedia file), the transcoded data can be sent or stored on any existing service and be opened just as easily using the Arebus transcoding/detranscoding platform without the need for additional support, conventions, or integration.

The described examples provide a way to encrypt and control any type of content the user would like to protect while transmitting over third-party applications and services. This encryption can be done first, then the resulting encrypted file can be transcoded to multimedia content. Clear data would first be encrypted, using any encryption algorithm and methodologies, including RSA using public and private keys, Blowfish, Twofish, AES and utilizing any key size (e.g., 128-bit or 256-bit) then sent/stored via the internet/web.

The described embodiments incorporate technology offering solutions around various novel components: First, Clear Data (encrypted or unencrypted) is transcoded (described in detail below) into a universally accepted multimedia file format (e.g., the Clear Data is used to generate a new multimedia file such as an image file, video file or audio file), which can be sent, posted, or stored online through existing services. Second, (optional) encryption, contact, and key management elements, are tasked with encrypting the Clear Data, and (optionally) using an end user's library of contacts to select who and/or what can access the data. In the encrypted scenario, upon receiving/opening of encrypted file, the Clear Data is extracted from the multimedia file format, then the receiving user authenticates receipt of the data via the contact list platform/key management service, and then encrypted file is decrypted and the Clear Data is presented to the receiving user on their device.

Exemplary, but not exhaustive, examples of the Arebus system/algorithms have been provided below, with reference to corresponding Figures. These examples are for illustration purposes only, and do not in any way limit the applicability, order or right supported in the Arebus disclosure.

FIGS. 1-7 describe numerous algorithms for transcoding (converting Clear Data into an indecipherable multimedia file) and/or detranscoding (converting the indecipherable multimedia file back into the Clear Data) data for secure transmission and/or storage without requiring businesses to modify their existing software (i.e. the transcoding/detranscoding algorithms can be an add-on to the businesses already existing software). For context, each of the FIGS. 1-7 are described below with respect to a use case.

FIG. 1 describes a scenario for protecting the privacy of a 1:1 communication between two individuals (User A and User B). A use case for the configuration in FIG. 1 includes but is not limited to a private message (e.g., email, IMS, etc.) being communicated between two entities (e.g., users, businesses, applications, etc.).

For example, a first private user may want to send Clear Data in the form of a private text document and a private image to a second private user via email or social media message. In general, Arebus would transcode the private text document and the private image prior to transmission of the email/social media message (convert the Clear Data into an indecipherable multimedia file). The transcoding entails converting the raw data from each file into respective indecipherable multimedia files (e.g., the text document is transcoded into an indecipherable image and the private image is transcoded into another indecipherable image). It should be noted that in some embodiments, the transcoding algorithm is considered a "lossless" algorithm where none of the Clear Data lost during the transcoding phase (e.g., all of the Clear Data is converted into the multimedia file).

The indecipherable images produced by the transcoding are then transmitted to the second private user where they are detranscoded back into the original Clear Data so that they can be viewed (e.g., convert the indecipherable multimedia file back into the Clear Data). It should be noted that prior to detranscoding, the Clear Data cannot be deciphered by the human eye. Thus, even if a hacker intercepts the email or hacks into the recipient's email account, it will be difficult to decipher the private text file and image (i.e., the hacker would see indecipherable images that look like randomly distributed pixels). Although transcoding makes the Clear Data indecipherable, encryption of the data prior to transcoding would add another layer of protection so that it will be even more difficult for the hacker to determine the Clear Data.

In a similar use case, a patient may need to take a picture of a personal medical condition and send it to a doctor at the hospital. The algorithm in FIG. 1 would allow the patient to encrypt (optional), then transcode this private image into an indecipherable image, and then transmit it to their doctor via email, text message, website upload, etc. This indecipherable image is then safely stored on the hospital's server until the doctor detranscodes and decrypts (optional) it to the original Clear Data image to perform his/her medical diagnosis. Thus, even if a hacker hacks into the hospital server computer, the hacker would not be able to view the patient's personal picture since it is stored in transcoded form.

In step 100, for example, User A, using a transcoding/detranscoding device (e.g., PC, Smartphone, etc.), identifies Clear Data that can include text, pictures, and other content or files. User A then specifies who has the rights to access the Clear Data (User B in the example above) and which third-party service should be used to deliver that Clear Data (email, text, other channels). User B may be identified as a recipient by selecting the electronic contact information for User B, which may include identification/access to User A's contact lists located on any software/application utilized by User A. In step 102, user B's delivery information is fed to the Access Control List (ACL) which manages multiple items in Arebus including User identities, relationships between User identities/data, address book functions, groupings of identities, and User permissions among others. For example, during operation, the ACL in step 102 may determine (using a permission list) if User A has permission to utilize the encryption/transcoding algorithm. If User A is permitted to utilize the encryption/transcoding algorithm, the process proceeds to the next step. If User A does not have permission to utilize the encryption/transcoding algorithm, the process ceases.

Assuming User A is granted permission by the ACL, the Clear Data is then encrypted in step 114 through the encryption engine (hereafter "Encrypted Data") which provides key management and selects appropriate encryption algorithms which may include symmetric key cryptographic algorithms (e.g., advanced encryption standard (AES), data encryption standard (DES), etc.) and/or public key cryptographic algorithms (e.g., Rivest-Shamir-Adleman (RSA), digital signature services (DSS), Diffie-Hellman, etc.). The Encrypted Data is then transcoded in step 104 to generate an indecipherable multimedia file (hereafter "Transcoded Data") which is used as the universal format for transmission of Clear Data across many third-party email, text, social media, and other services. This generated indecipherable multimedia file includes data that is indecipherable to the human eye/ear (e.g., an image, video or audio file that looks/sounds like random noise). The Transcoded Data is transmitted in step 106 through a chosen third-party service, and is then received by User B.

Once received by User B, the Transcoded Data is then detranscoded, using a transcoding/detranscoding device (e.g., PC, Smartphone, etc.), in step 108 from the indecipherable multimedia file to the Encrypted Data file, which is then checked against the ACL in step 110 to authenticate User B as the intended recipient. For example, during operation, the ACL in step 110 may determine (using a permission list) if User B has permission to receive the message from User A and utilize the decryption/detranscoding algorithm. If User B is permitted to utilize the encryption/transcoding algorithm (i.e., is the intended recipient), the process proceeds to the next step. If User B does not have permission to utilize the encryption/transcoding algorithm, the process ceases. It should be noted that the ACL in step 102 and the ACL in step 110 (i.e., the ACL used for transmission and reception) include the same transcoding/detranscoding algorithms, encryption/decryption algorithms, digital signature algorithms, and respective keys to perform the processing of the data. Assuming User B is permitted by the ACL, then the Encrypted Data file is decrypted in step 116 and the Clear Data is accessible by User B in step 112.

It should be noted that in FIG. 1 (described above), and in FIGS. 2-7 (described below), the detranscoding algorithm is essentially the opposite of the transcoding algorithm (detranscoding is the reverse of transcoding). Thus, the transcoding and detranscoding algorithms (including any secret passwords) should be agreed upon by the transmitter and recipient prior to communications. Further details of these transcoding/detranscoding algorithms are described with respect to FIGS. 10, 13, and 14.

It should be noted that in FIG. 1 (described above) and in FIGS. 2-7 (described below), the encryption/decryption steps and ACL user rights steps are optional. The Clear Data can simply be transcoded and then either securely transmitted to a recipient where it is detranscoded, or securely stored in local or remote memory. The transcoding of the Clear Data may be sufficient to protect the content of the Clear Data from being viewed/utilized by unwanted parties. The encryption and ACL user rights management steps add additional (optional) layers of protection over the Clear Data.

Figure 16:
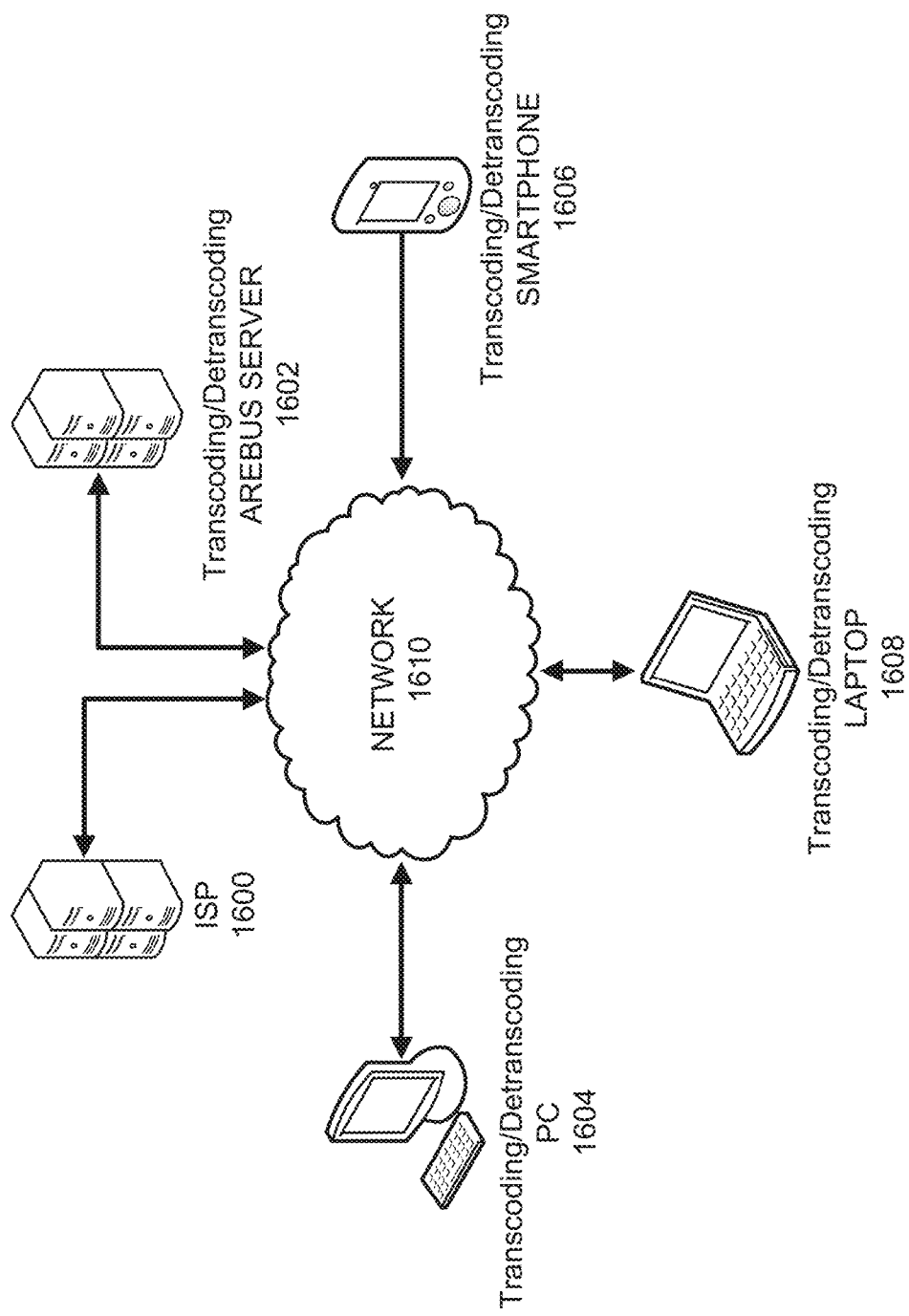
FIG. 16 shows system diagram for transcoding and detranscoding data.

Shown in FIG. 16 is an example system diagram of network communication between User A and User B described FIG. 1 and throughout the remaining FIGS. The network system may include end user devices such as personal computer (PC) 1604, Laptop 1608 and SmartPhone 1606 which may be operated by various users. For example, User A may operate PC 1604, and User B may operate SmartPhone 1606. These end user devices communicate with each other and other network devices such as internet service provider (ISP) server 1600, and Arebus server 1602 via network 1610.

In one example, the transcoding algorithm is performed by the end user device. For example, User A operating PC 1604 may communicate with ISP server 1600 and Arebus server 1602 to download the transcoding/encryption algorithms described with reference to FIGS. 1-7. Once downloaded, PC 1604 performs multimedia file transcoding (e.g., generates an indecipherable multimedia file using the Clear Data), and optionally encryption of the Clear Data, and either transmits this indecipherable multimedia file to SmartPhone 1606 operated by User B, or simply stores this indecipherable multimedia file locally on PC 1604.

In another example, the transcoding algorithm is performed remotely in the server. For example, User A operating PC 1604 may communicate with ISP server 1600 and Arebus server 1602 to upload Clear Data to the Arebus server 1602. Arebus server 1602 then transcodes the Clear Data into an indecipherable multimedia file and then transmits the indecipherable multimedia file back to PC 1604 or to some other designated recipient(s) device such as SmartPhone 1606. In either example, the Clear Data is transcoded into a multimedia file that is indecipherable until detranscoded.

Figure 15:
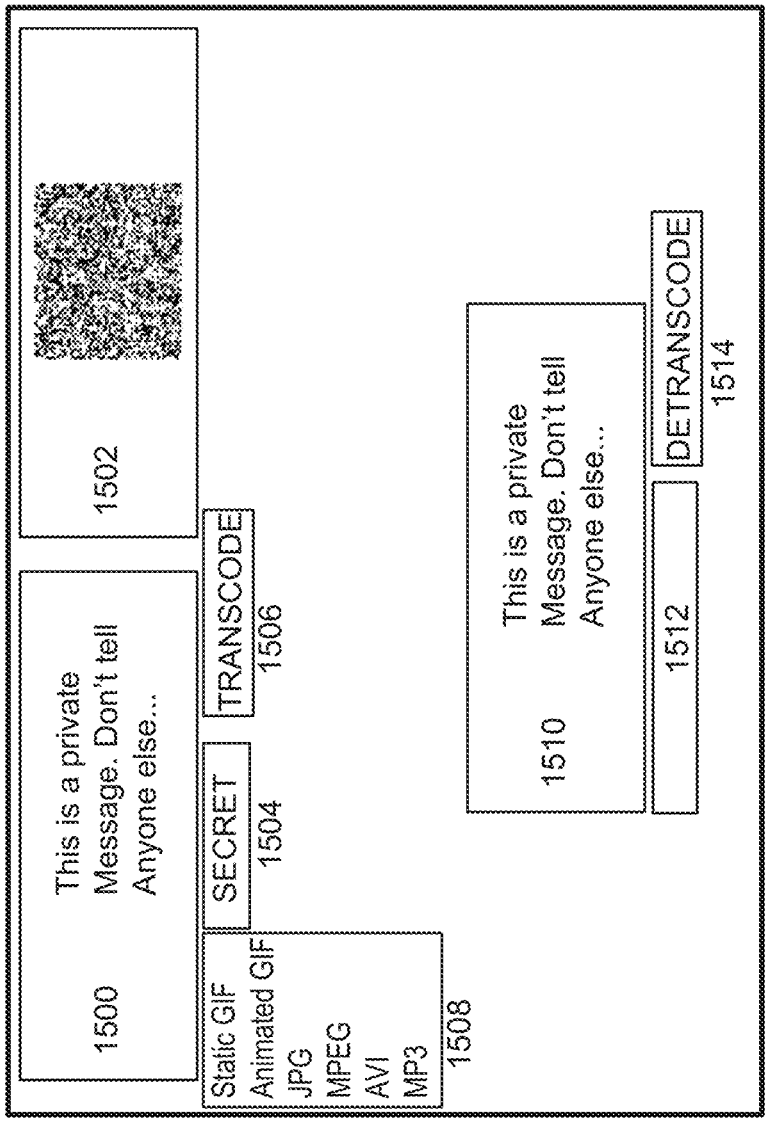
FIG. 15 shows an example of a graphical user interface used for transcoding and detranscoding data.

Shown in FIG. 15 is a graphical user interface (GUI) for performing transcoding of Clear Data into indecipherable multimedia files. The upper portion of the GUI is configured to perform transcoding of Clear Data. This upper portion of the GUI includes a window 1500 for typing Clear Data or dragging and dropping Clear Data files. Also included is a drop-down menu 1508 for selecting a type of multimedia file (e.g., JPEG, graphics interchange format (GIF), etc.), password window 1504 for selecting a password to use in the transcoding algorithm, button 1506 for triggering the transcoding of the Clear Data, and output window 1502 for displaying the transcoded indecipherable multimedia file.

For example, if User A wants to transcode a Clear Data file such as a private text file, User A can simply drag and drop the text file into window 1500, select a multimedia file type from menu 1508, enter a secret password into window 1504 and then click button 1506. The transcoding algorithm (either performed by PC 1604 or remote server 1602) the transcodes the text file into the selected multimedia file format (e.g., generates a JPEG file based on the Clear Data) and displays this indecipherable multimedia file in window 1502.

In contrast, the lower portion of the GUI is configured to perform detranscoding of the indecipherable multimedia file. This lower portion of the GUI includes a window 1510 to drag and drop the indecipherable multimedia file, window 1512 to enter the secret password and a button 1514 to initiate the detranscoding algorithm.

For example, if User B wants to detranscode a multimedia file (e.g., the JPEG) received from User A, User B can simply drag and drop the JPEG file into window 1510, enter the same secret password that was used for transcoding into window 1512 and then click button 1514. The detranscoding algorithm (either performed by SmartPhone 1606 itself or by remote server 1602) then detranscodes the JPEG back into the Clear Data and displays this Clear Data to User B (i.e., User B can decipher the private text file sent by User A). It should be noted that if JPEG or other compression-based file is selected, the Clear Data is supplemented with extra padding (e.g., random bits) to provide enough data to allow the JPEG compression to take place.

Figure 2:
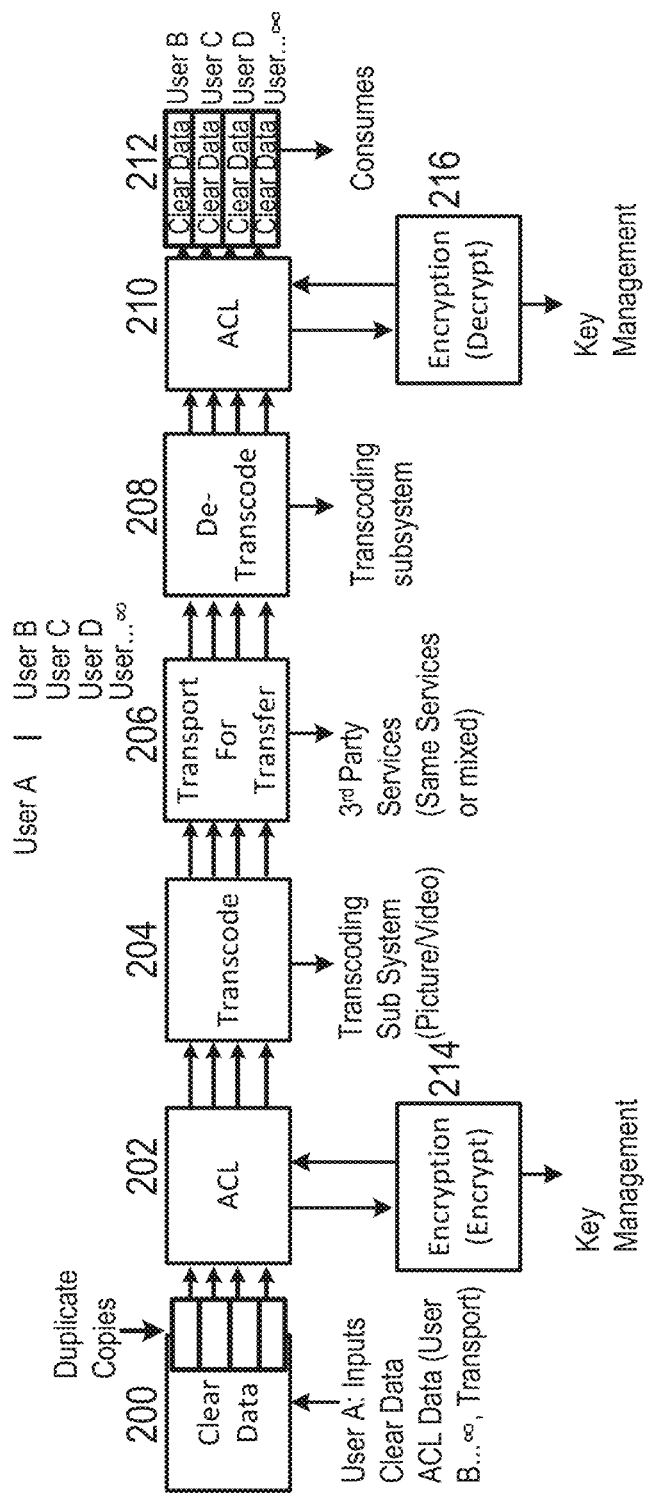
FIG. 2 is an exemplary flowchart depicting transcoding/detranscoding between a single transmitter device and multiple independent recipient devices, according to an embodiment or portion of an example embodiment.

The remaining FIGS. 2-7 show other embodiments for performing transcoding and detranscoding, that are variations of the embodiment shown in FIG. 1. For example, FIG. 2 provides another scenario for use of Arebus wherein User A is able transmit the same Clear Data payload to multiple recipients (User B, C . . . ∞) protecting the privacy of the Clear Data between many individuals, wherein each User B, C . . . ∞ might have a different security policy.

A use case for the configuration in FIG. 2 includes but is not limited to marketing/online advertisement campaigns targeting individuals each having different security policies. For example, a marketing company may want to target multiple individuals (e.g., customers or potential customers) with a common message including the same private text document and a private image (e.g., common advertisement). In general, Arebus would duplicate the Clear Data for each individual, insert ACL security policy rights and then transcode the documents prior to transmission of the private messages (see steps below). The transcoding algorithm entails converting the raw data from each file into respective indecipherable multimedia files (e.g., the text document is transcoded into an indecipherable image and the private image is transcoded into another indecipherable image). These indecipherable images are then transmitted to each of the targeted individuals where they are detranscoded back into the original Clear Data advertisement so that they can be viewed (assuming the targeted individuals have the security policy rights to perform detranscoding).

First, in step 200, User (A) identifies Clear Data that can include text, pictures, and other content or files. User A then specifies individuals who will have the right to access the Clear Data (User B, C . . . ∞) and which third-party service(s) should be used to deliver the Clear Data (through email, text, other channels) to each (User B, C . . . ∞). This information is replicated as many times as necessary (e.g., based on the number of recipients) and fed to the ACL in step 202. In step 214, the Clear Data is then encrypted through the encryption engine using appropriately selected encryption algorithms. The Encrypted Data is then transcoded in step 204 to a selected type of multimedia file format which is used as the universal format for transmission across many third-party email, text, social media, and other services. The services used for transmission can be one and the same or mixed across different services. The Transcoded Data is then transmitted in step 206 through the chosen third-party service(s) and received by the intended users using the same service. Once received by (User B, C . . . ∞), the transcoded Data is detranscoded in step 208 from the multimedia file to the Encrypted Data file, which is then checked against the ACL in step 210 to authenticate each (User B, C . . . ∞) as the intended recipients. Once authenticated the Encrypted Data file is decrypted in step 216 and the Clear Data is accessible by each individual (User B, C . . . ∞) in step 212. As mentioned earlier, each recipient (Users B, C . . . -∞) can be assigned a different level of security for the Clear Data. Examples of these levels may include: "read only", "read once", "unlimited access", "watermarked", "deleted after a finite amount of time", etc.

Figure 3:
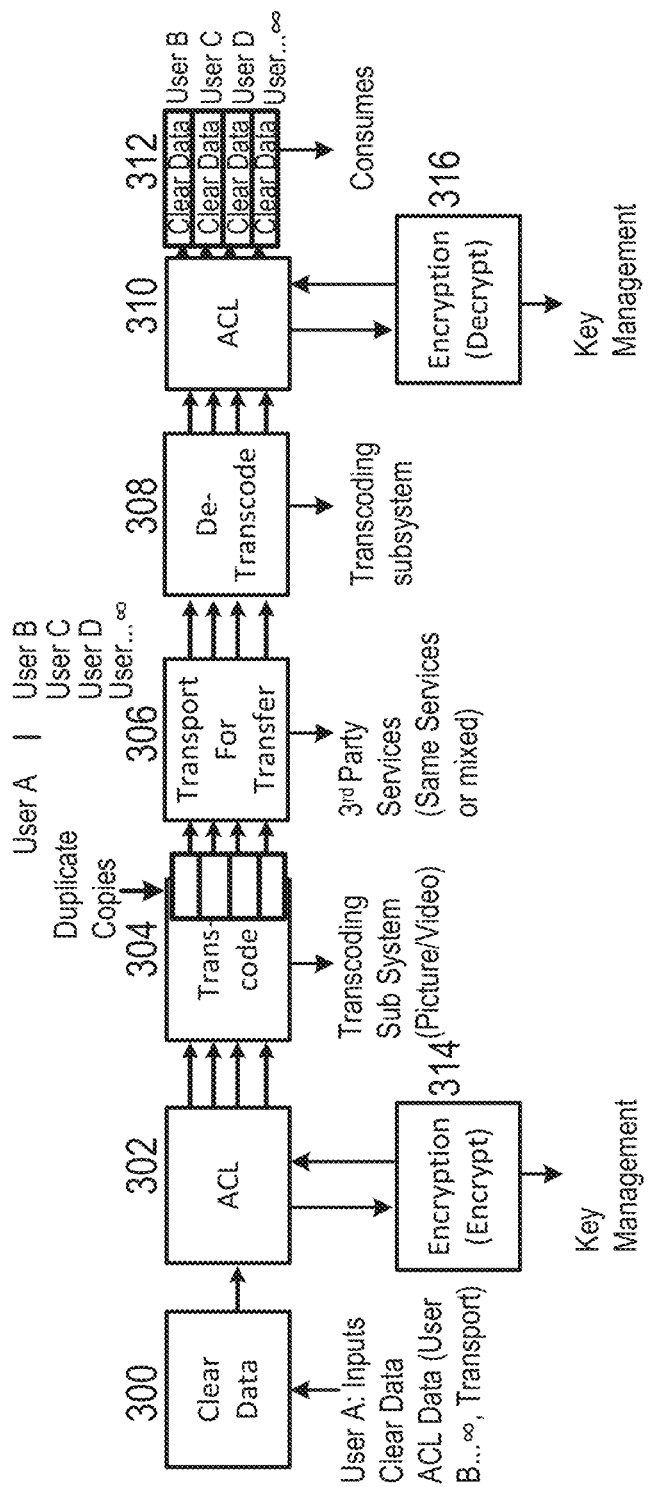
FIG. 3 is an exemplary flowchart depicting transcoding/detranscoding between a single transmitter device and multiple recipient devices in a group, according to an embodiment or portion of an example embodiment.

FIG. 3 provides yet another scenario for use of Arebus in transmitting data. The scenario detailed in FIG. 3 is intended to protect the privacy of a conversation between an individual and a group (Users B, C . . . ∞) with a common security policy.

A use case for the configuration in FIG. 3 includes but is not limited to a text message being sent to a group of recipients. For example, a person may want to send a private text message including an image to multiple individuals (User B, C . . . ∞) (e.g., social media friends). In general, Arebus transcodes the text and image of the text message prior to transmission (see steps below). The transcoding algorithm entails converting the raw data from the text message into an indecipherable multimedia file (e.g., the text message data is transcoded into an indecipherable image). This indecipherable image is then transmitted to each of the members of the group where it can be detranscoded back into the original Clear Data text message for viewing.

First, in step 300, User (A) identifies Clear Data that can include text, pictures, and other content or files (Clear Data). User A then specifies a group of individuals intended to have collective access to the Clear Data (User B, C . . . ∞ in the example above), and which third-party service(s) should be used to deliver the Clear Data (through email, text, other channels). This information is fed into the ACL in step 302. The Clear Data is then encrypted in step 314 through the encryption engine using appropriately selected encryption algorithms. The Encrypted Data is then transcoded in step 304 to multiple multimedia file formats (e.g., picture or video) which are used as the universal format for transmission across to the individuals belonging to the group through the many third-party email, text, social media, and other services. The services used for transmission can be one and the same or mixed across different services. The transcoded data is then transmitted in step 306 through the chosen third-party service(s) which are received by the individual Users (User B, C . . . -∞) using the same service. Once received, the transcoded data files are detranscoded in step 308 from the multimedia files to the Encrypted Data files, which are then checked against the ACL in step 310 to authenticate the individual Users. Once authenticated the Encrypted Data files are decrypted in step 316 and the Clear Data is consumed by individual Users in step 312.

Figure 4:
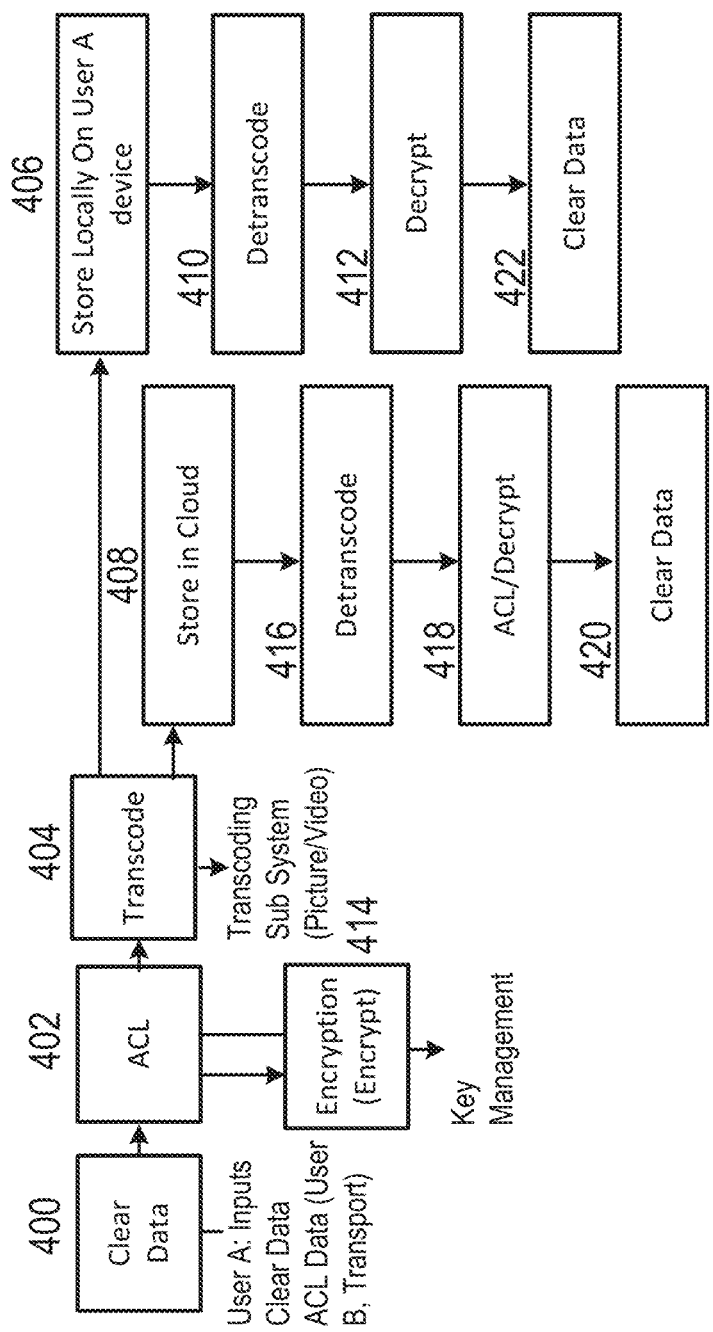
FIG. 4 is an exemplary flowchart depicting transcoding/detranscoding on a user device, according to an example embodiment or portion of an example embodiment.

The scenario detailed in FIG. 4 is intended to protect the privacy of an individual's data stored locally on the user's device(s) or in a cloud service. A use case for FIG. 4 would be a user storing a private image locally on their smartphone, computer, or remotely in the cloud. For example, when the user takes a picture with their smartphone, this image may be transcoded into an indecipherable image which can then be stored locally on the smartphone or uploaded to a cloud storage server. In either scenario, the transcoded image is secure from being viewed even if the user's smartphone or the cloud server is hacked. When the user wants to retrieve the image from local storage or from the cloud storage, the user's smartphone (or one of the user's other authorized devices), running Arebus, detranscodes the image into the original Clear Data image to be viewed.

In step 400, User A chooses the Clear Data that can include text, pictures, and other content or files. User A then specifies that only he/she has access to the Clear Data and where they would like to store the Clear Data. This Clear Data is fed to the ACL in step 402. The Clear Data is then encrypted in step 414 through the encryption engine using appropriately selected encryption algorithms to create the Encrypted Data. The Encrypted Data is then transcoded in step 404 to a multimedia file (picture or video). The Transcoded Data is then stored locally in step 406 and/or in stored the cloud (public, private, or hybrid) in step 408. When User A would like to retrieve the data stored locally from the device, User A simply detranscodes in step 410 and decrypts in step 412 the multimedia file to retrieve the clear data in step 422. When User A or User B would like to retrieve the Data stored in the cloud, the Transcoded Data is detranscoded from the multimedia file in step 416 to the Encrypted Data file, which is then checked against the ACL in step 418 to authenticate the User. Once authenticated the Encrypted Data file is decrypted in step 418, the Clear Data is accessible by User A in step 420. User B cannot decrypt the data, and thus cannot access the Clear Data unless User A shares the encryption key and encryption method. It should be noted that User A can store/retrieve the Data in/from the cloud using multiple devices (e.g., User A could upload the Data to the cloud using their PC and then download the Data from the cloud using their Smartphone). An exemplary use case of this would be an individual taking a private picture and securely storing it on their phone/cloud to protect against local/online hackers exposing the picture to third parties if accessed.

Figure 5:
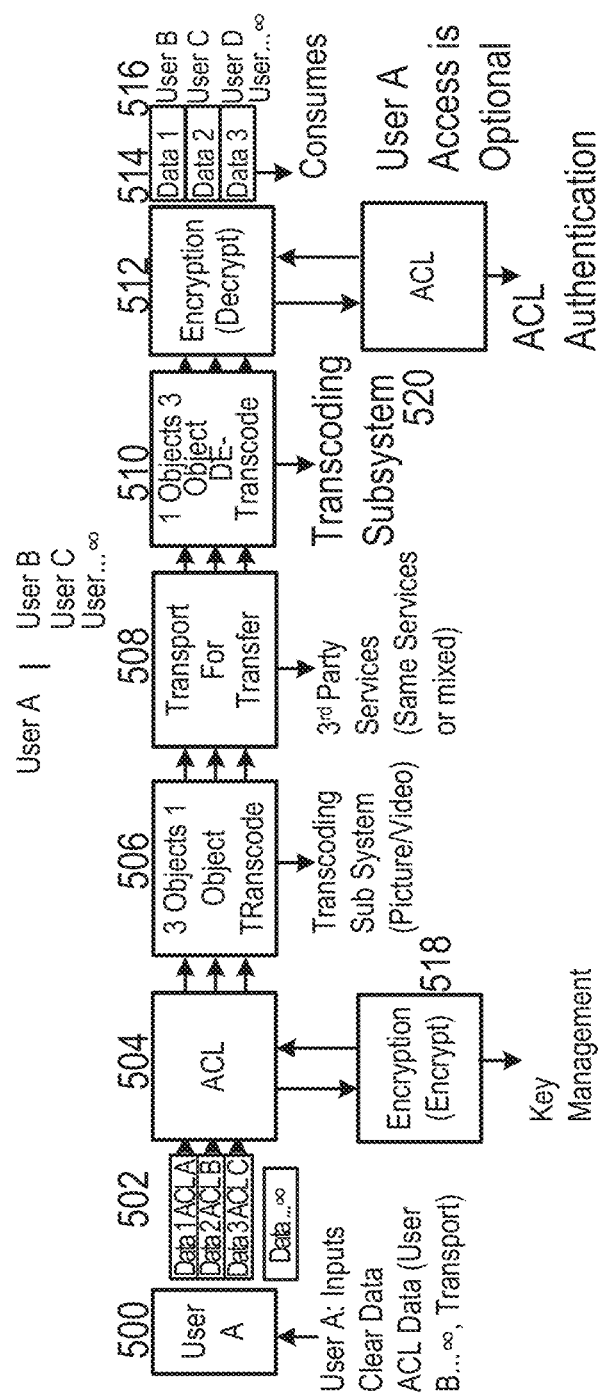
FIG. 5 is an exemplary flowchart depicting transcoding/detranscoding between a single transmitter device and multiple recipient devices, according to an example embodiment or portion of an example embodiment.

FIG. 5 provides another scenario combining multiple data payloads (e.g., different files) into one transport communication, where each payload has individual security permissions and encryption. A use case for FIG. 5 includes but is not limited to a marketing/online advertisement campaign targeting individuals each having different security policies (similar to FIG. 2). However, in this case, a marketing company may want to target multiple individuals (e.g., customers or potential customers) with private messages or images including a different private text document and a different private image for each individual (i.e., individual advertisements).

In general, Arebus would take each payload message, optionally insert ACL security policy rights, optionally encrypt, and then transcode the documents into one multimedia file prior to transmission of the private messages (see steps below). The transcoding algorithm entails converting the raw data from each file into one combined file which is then transcoded into an indecipherable multimedia file (e.g., a text document is assigned its own ACL, another private document is assigned its own ACL, then the two are combined into one package which is then transcoded to an indecipherable image). This single indecipherable image is transmitted to each of the targeted individuals, where it is detranscoded, and based on their own permission, is accessed.

First, User (A) 500 composes multiple payloads in step 502 sets that can include text, pictures, and other content or files (Clear Data). User A then specifies a group of individuals who have collective access to each Data payload (User B, C . . . ∞ in the example above) and which third-party service(s) should be used to deliver the Data (through email, text, other channels). This information is fed to the ACL in step 504. Each payload is individually encrypted through the encryption engine at step 518 and appropriate encryption algorithms are selected. The encrypted data is then transcoded in step 506 to one single multiple multimedia file (e.g., picture, video, audio, etc.) which is used as the universal format for transmission in step 508 across to the individuals belonging to the group through third-party email, text, social media, and other services. The services used for transmission can be one and the same or mixed across different services. The multimedia file is then transmitted through the chosen third-party services which are received by the individual users using the same service. Once received, in step 510, the files are detranscoded from the multimedia file to the encrypted data files, which are then checked against the ACL in step 520 to authenticate which Data payload is accessible by the individual Users. Once authenticated the specific encrypted data file is decrypted in step 512 and the Clear Data 514 is consumed by the individual Users 516. A use case for the algorithm in FIG. 5 could be a marketing implementation. For example, a marketer can send one file to many potential customers, and custom tailor the content to the customers' preferences. Each customer would be limited to detranscoding specific content specified by their rights in the ACL.

Figure 6:
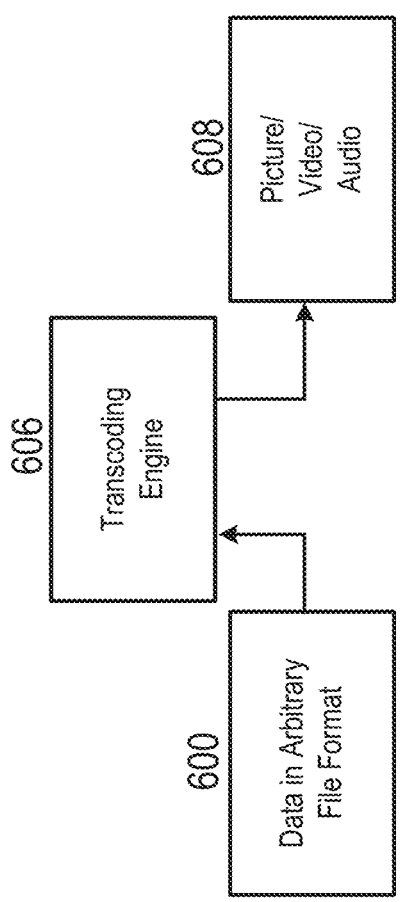
FIG. 6 is an exemplary flowchart depicting transcoding of data into a multimedia file, according to an example embodiment or portion of an example embodiment.
Figure 9:
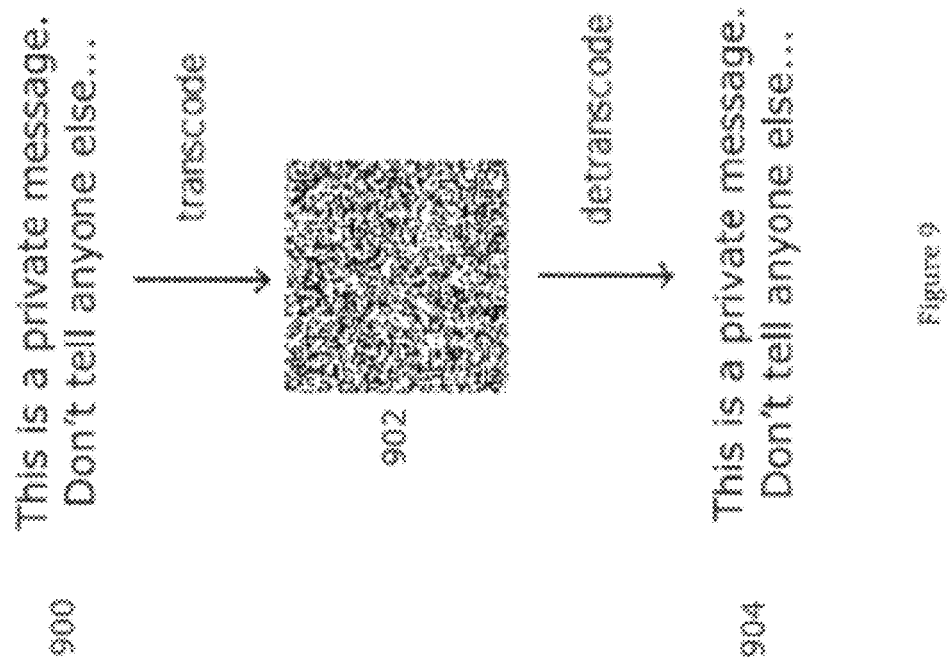
FIG. 9 is an example flowchart depicting transcoding/detranscoding of basic text, according to an embodiment or portion of an example embodiment.

Although the scenarios provided above are detailed with the use of a two-step process incorporating encryption of data and transcoding of data, one skilled in the art should appreciate that the encryption process is not essential to the transmission of Clear Data through conventional social media platforms. In fact, depicted in FIGS. 6 and 9, are the transcoding of Clear Data to a multimedia file format for transmission through social media platforms. As before, the recipient of the Transcoded Data uses Arebus to detranscode the Transcoded multimedia file format to Clear Data. Accordingly, any of the scenarios detailed above, as well as any contemplated scenarios for use of Arebus can be accomplished without the encryption and/or ACL element.

For example, FIG. 6 shows that in step 600 data in any arbitrary Clear Data form can be input to the algorithm. In step 606 this Clear Data is transcoded into an indecipherable multimedia file such as a picture, video or audio file as shown in step 608. The transcoding itself could be enough to protect the Clear Data from being deciphered. Encryption, however, would add an additional layer of protection. Furthermore, it is understood that the steps for transmitting Clear Data via online service platforms (social media platforms, medical systems, others), can be reordered without any negative repercussions, as detailed in FIG. 7 and FIG. 8.

Figure 7:
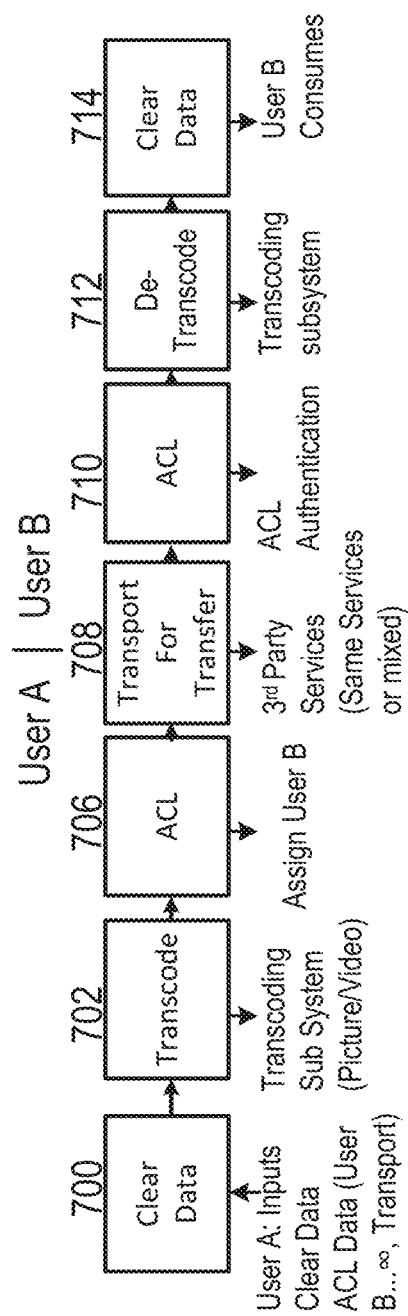
FIG. 7 is an exemplary flowchart depicting transcoding/detranscoding between a single transmitter device and a single recipient device without encryption, according to an example embodiment or portion of an example embodiment.

FIG. 7, for example, provides a use of Arebus without an encryption element. Accordingly, User (A) identifies Clear Data in step 700 that can include text, pictures, and other content or files. The Clear Data is then transcoded in step 702 to a multimedia file format (hereafter "Transcoded Data") which is used as the universal format for transmission of Clear Data across many third-party email, text, social media, and other services. User A then specifies who has the rights to access the Data (User B in the example above) and which third-party service should be used to deliver that Data (email, text, other channels). User B may be identified by selecting the electronic contact information for User B, which would include identification/access to User A contact lists located on any software/application utilized by User A. User B's delivery information is fed to the Access Control List (ACL) in step 706 which manages multiple items in Arebus including identity, relationships between identities/data, address book functions, and groupings of identities. The Transcoded Data is then transmitted through the chosen third-party service in step 708, which is received by User B. The ACL in step 710 is used to authenticate User B as the intended recipient, and the Transcoded Data file is detranscoded in step 712 from the multimedia file to Clear Data, which is accessible by User B in step 714.

The algorithms described in FIGS. 1-7 transcode Clear Data into an indecipherable multimedia file (e.g., image). A simple visual example of this process is shown in FIG. 9 where Clear Data text 900 is transcoded into an indecipherable image 902 and then detranscoded back into the original Clear Data text 904.

Figure 10:
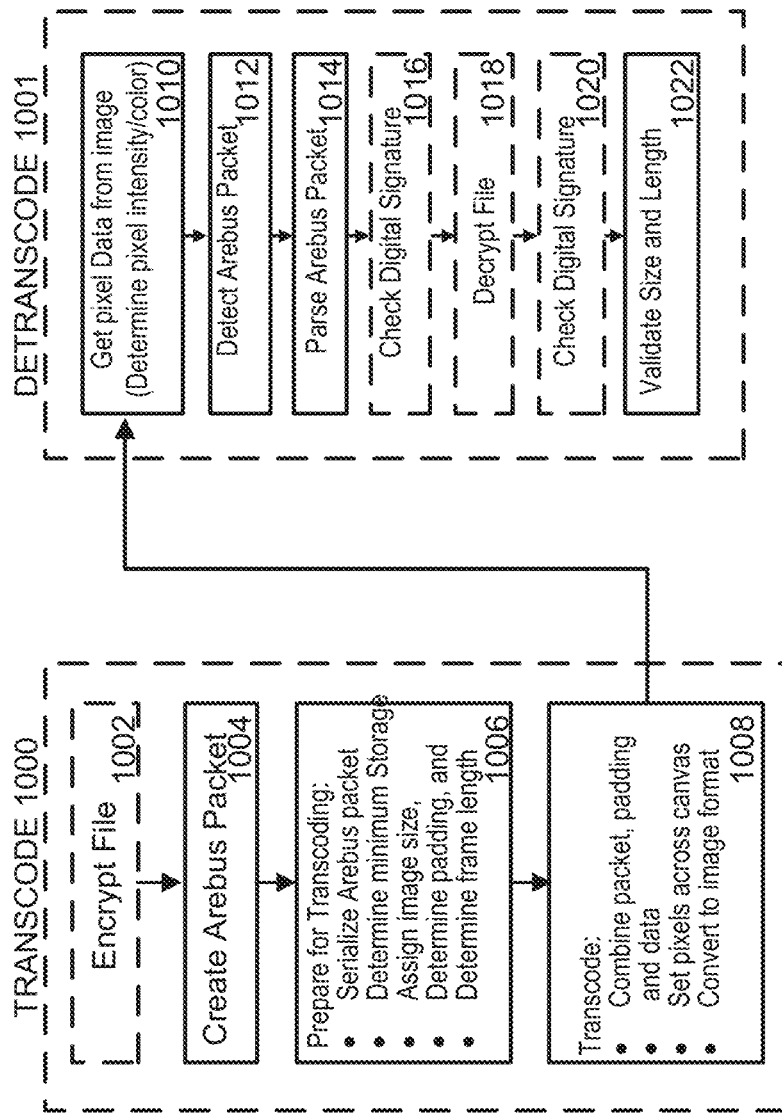
FIG. 10 shows an example flowchart depicting an algorithm for transcoding data as an image file and then detranscoding the data.

Shown in FIG. 10 is a detailed flowchart depicting an algorithm for transcoding data as an indecipherable image file and then detranscoding the data. In the transcoding phase in section 1000, a user device (e.g., PC) may optionally perform encryption (e.g., public key/symmetric key cryptography) of the Clear Data (e.g., text file) in step 1002. It should be noted that encryption step is optional. In step 1004, the user device creates a special packet that defines the various parameters including file size, digital signature (e.g., checksum) of the Clear Data file, and digital signature of encrypted file.

In step 1006, the user device prepares for the transcoding process by determining properties of the multimedia file. For example, the user device may: 1) serializes the special packet(s), 2) determine a minimum amount of storage needed to transcode (e.g., size of special packet+size of encrypted file; The total bits=total pixels needed in transcoded image), 3) assign an image size based on the minimum storage (e.g., 160×60 pixels for animated GIF, for single image gif/jpg/other the file is determined based on total number of pixels needed split between height and width), 3) determine padding necessary for any unused storage within the image size, and 4) determine the total length of the frame to support file size.

In step 1008, the user device performs transcoding using these determined properties. In one example, the user device may: 1) combine packet+padding+data, and 2) set pixels across a canvas, and 3) convert to an image format such as GIF, JPG, portable network graphics (PNG), etc. (e.g., make individual GIFS for each frame, then concatenate the GIFS to an animated GIF).

During detranscoding phase 1001, a user device (e.g., another PC) may: 1) in step 1010 take the image and go through each image and get the pixel data (create a bit array), for example by determining color of each pixel (black pixels=0, white pixels=1) and using fault tolerance to make sure information can be extracted (e.g., pixel values between 0-127 in red-green-blue (RGB) format=0, and pixel values>127 in RGB format=1), 2) in step 1012 detect if the special (e.g., Arebus) packet is present, 3) in step 1014 parse the Arebus packet and determine if it is valid, and parse the encrypted data, 4) in optional step 1016 check digital signature to determine if the included encrypted data is intact, 5) in optional step 1018 decrypt the encrypted data, 6) in optional step 1020 check digital signature to determine if the original data is intact, and 7) in step 1022 check remaining Arebus packet attributes to validate size and digital signature of the Clear Data. If the check in step 1022 validates the Clear Data, the Clear Data is then made accessible to the user.

Figure 8A:
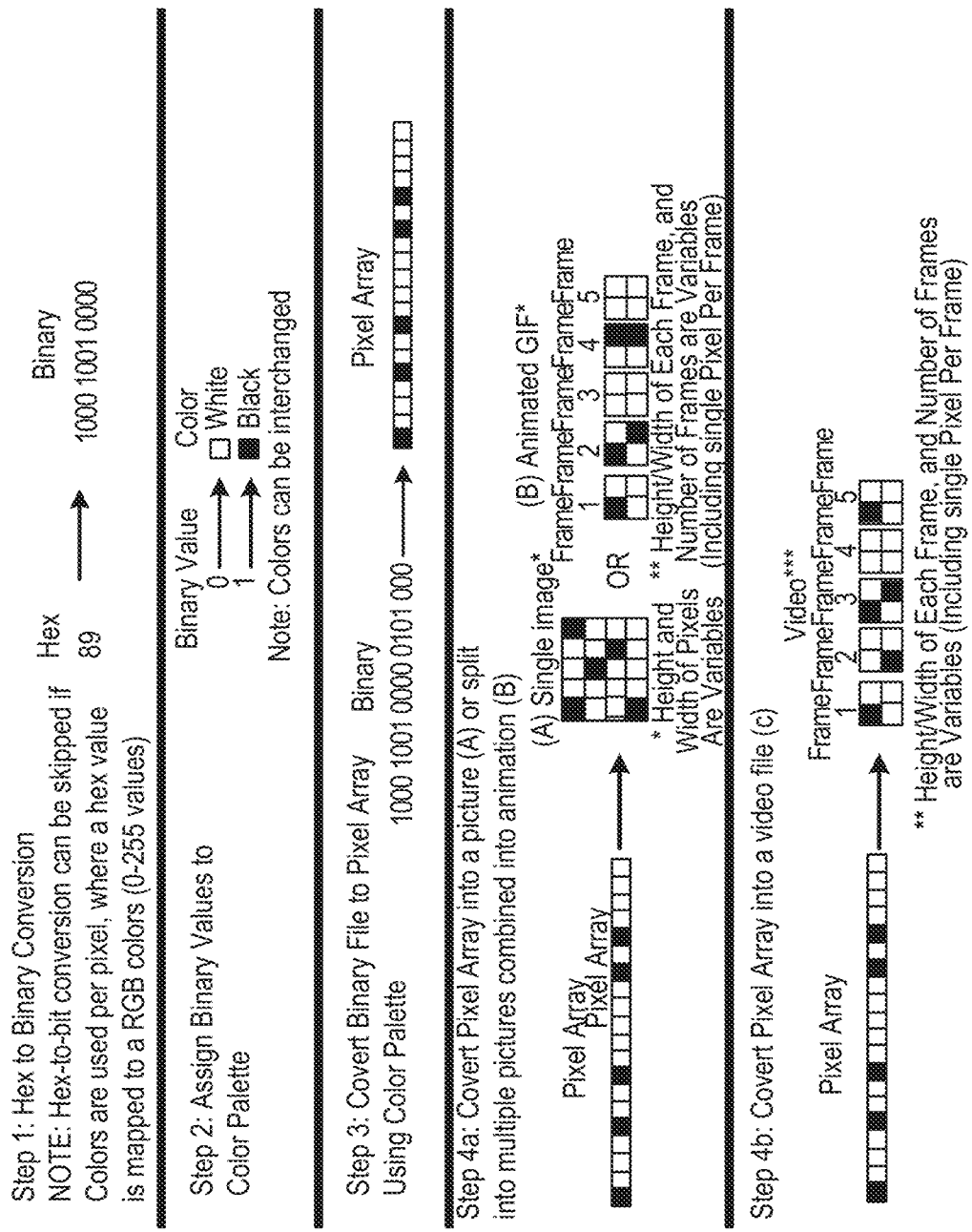
FIG. 8A is an example transcoding Clear Data into an indecipherable image or an indecipherable video file, according to an embodiment or portion of an example embodiment.

A simple example of data being processed during the transcoding phase 1001, is shown in step 1-4b of FIG. 8A. In step 1, a hexadecimal to binary conversion may be performed if needed (i.e., if the data is in hexadecimal format). In step 2, the binary values of 0 and 1 are assigned values to a color pallet (e.g., 0 corresponds to a white pixel and 1 corresponds to a black pixel). In step 3 the binary file is converted to a pixel array of black and white pixels. Finally, in step 4a, the pixel array is converted into a single picture. It should be noted that in step 1 if the data is left in hexadecimal form, then the algorithm in step 2 would simply include/assign a larger color pallet (e.g., 256 color pallet) to accommodate all of the hexadecimal possibilities.

Figure 11:
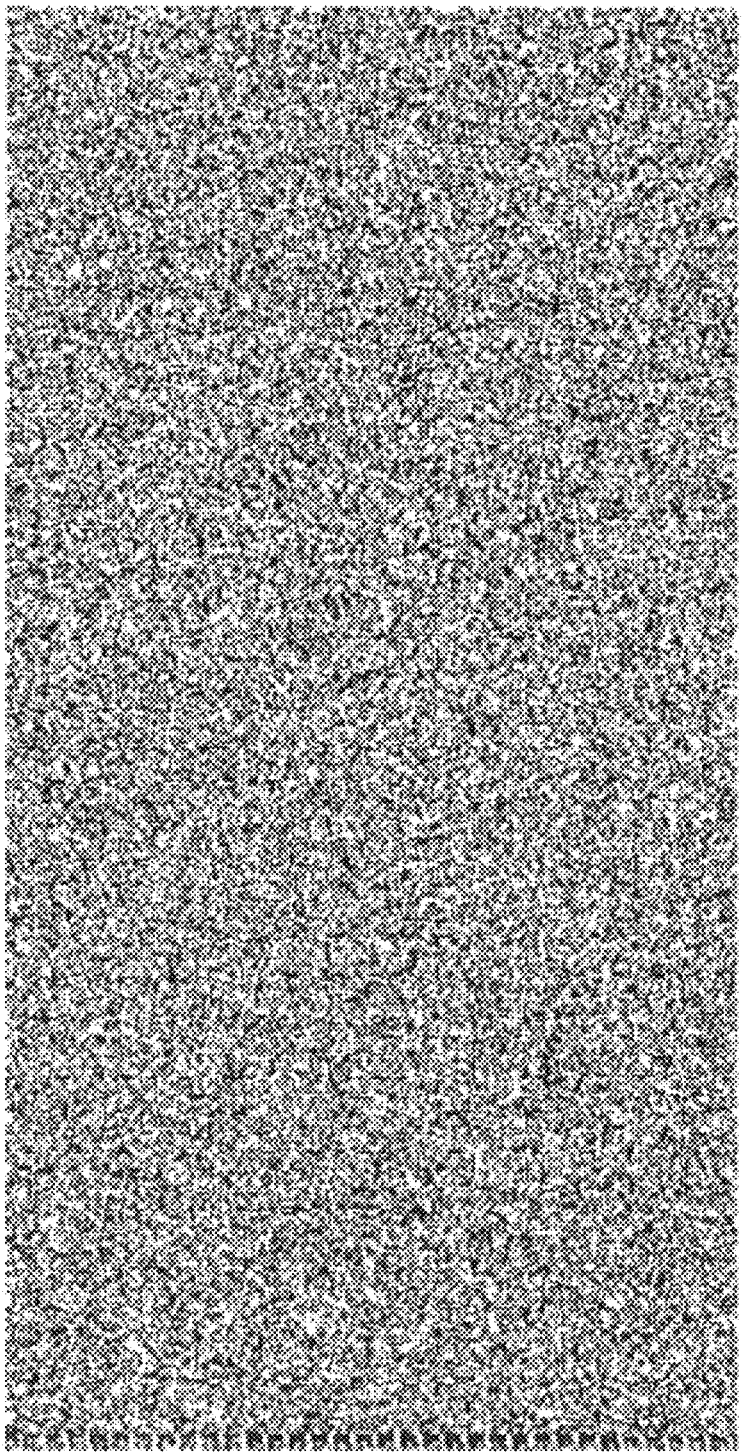
FIG. 11 shows an example of data transcoded as an indecipherable image.

Shown in FIG. 11 is an example of Clear Data transcoded as an indecipherable image. Clear Data (e.g., text file) is input to the transcoding algorithm and transcoded into a black and white image 1100 which appears to be a random distribution of black/white pixels thereby ensuring that the data is indecipherable to the human eye (e.g., the text from the text file cannot be deciphered simply by viewing image 1100).

Figure 12:
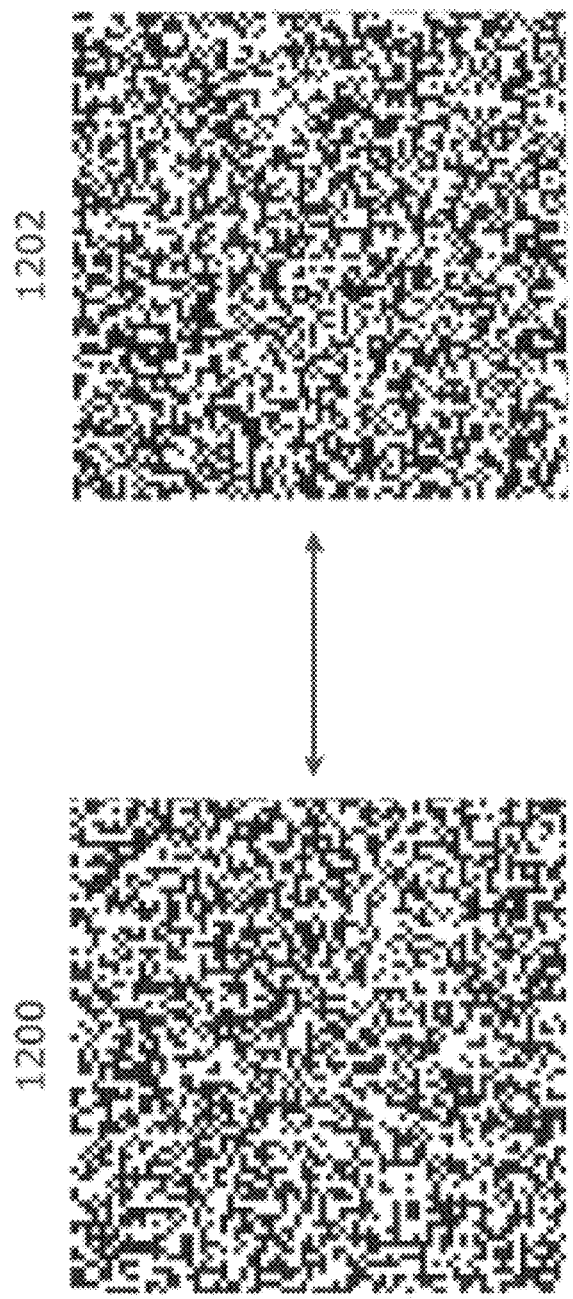
FIG. 12 shows an example of data transcoded as an indecipherable animated GIF.

Shown in FIG. 12 is an example of data transcoded as an animated GIF in step 4a of FIG. 8A. Generally, Clear Data (e.g., text file) is input to the transcoding algorithm and transcoded into multiple black and white images 1200 and 1202 which appear to be a random distribution of black/white pixels thereby ensuring that the data is indecipherable to the human eye (e.g., the text from the text file cannot be deciphered simply by viewing image 1100). In this animated GIF example, the images 1200 and 1202 would be two separate frames of the animated GIF. During animation, these frames are alternately displayed to the user (e.g., the display switches back and forth between images at a certain rate).

In some examples, the process separates access control for the data from the social media or online services upon which the data is sent or stored. For example, once the encrypted data is transcoded into a multimedia content element (e.g., the encrypted Clear Data is used to generate a multimedia file), the transcoded data can be sent or stored on any existing service and be opened just as easily using the Arebus Transcoding/detranscoding platform without the need for additional support, conventions, or integration.

As described above, the Clear Data can be transcoded into other types of indecipherable multimedia files such as video files and audio files. Described below with reference to FIGS. 13 and 14, the Clear Data is transcoded into an indecipherable video file (e.g., a video that looks like noise) and/or an indecipherable audio file (e.g., that sounds like noise) respectively.

Figure 13:
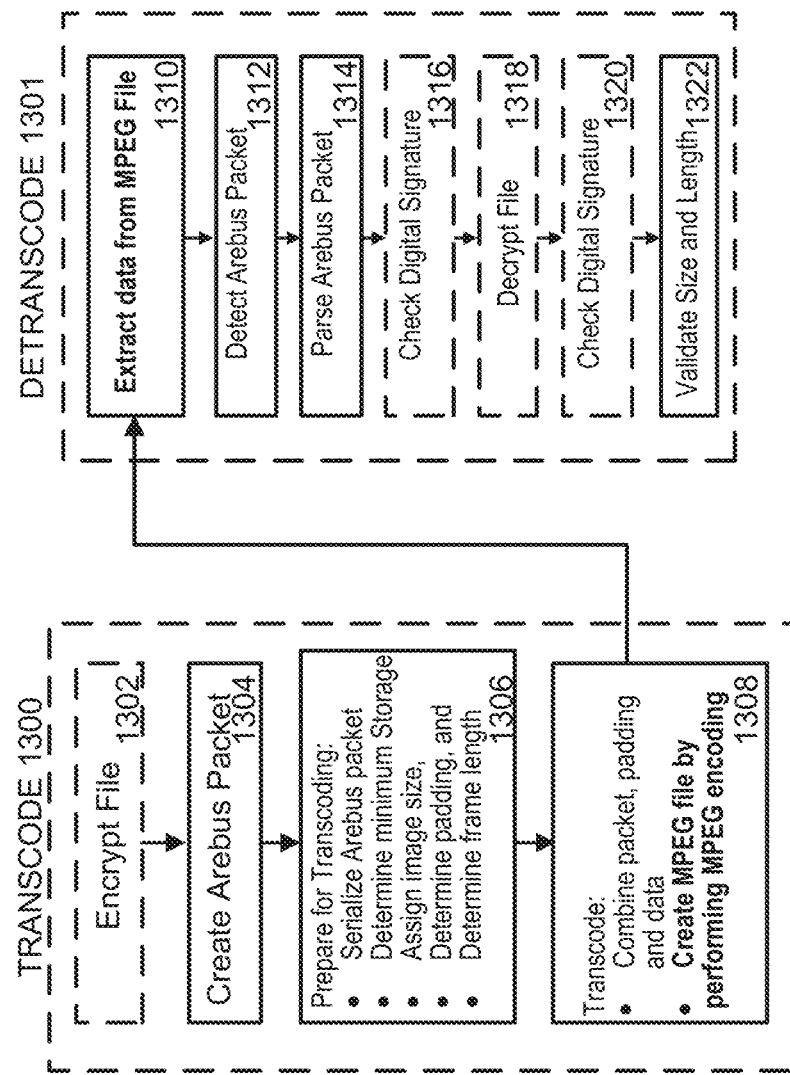
FIG. 13 shows an exemplary flowchart depicting an algorithm for transcoding data as an indecipherable video file and then detranscoding the data.

Shown in FIG. 13 is an exemplary flowchart depicting an algorithm for transcoding data as an indecipherable video file and then detranscoding the data. For transcoding Clear Data into a video file, most of the steps are similar to the steps in the flowchart of FIG. 10. For example, the transcoding phase 1300 performs encryption in optional step 1302, creates an Arebus packet in step 1304, prepares for transcoding by determining properties of the multimedia file in step 1306, performs transcoding based on the determined properties in step 1308, performs detranscoding in the detranscoding phase 1301 by extracting data from the transcoded file in step 1310, detecting the Arebus packet in step 1312, parsing the Arebus packet in step 1314, checking the digital signature in optional step 1316, decrypting the file as necessary in optional step 1318, checking the digital signature in optional step 1320 and validating the size and length of the data in step 1322. If the check in step 1322 validates the Clear Data, the Clear Data is then made accessible to the user.

However, since the data is being transcoded into video, there are some differences. For example, step 1-3 in FIG. 8A are performed. However, step 4b (converting the pixel array into a video file such as MPEG) is performed instead of step 4a. The opposite process is performed during detranscoding to retrieve the Clear Data. These different transcoding and detranscoding methods occur in steps 1306, 1308 and 1310.

Figure 14:
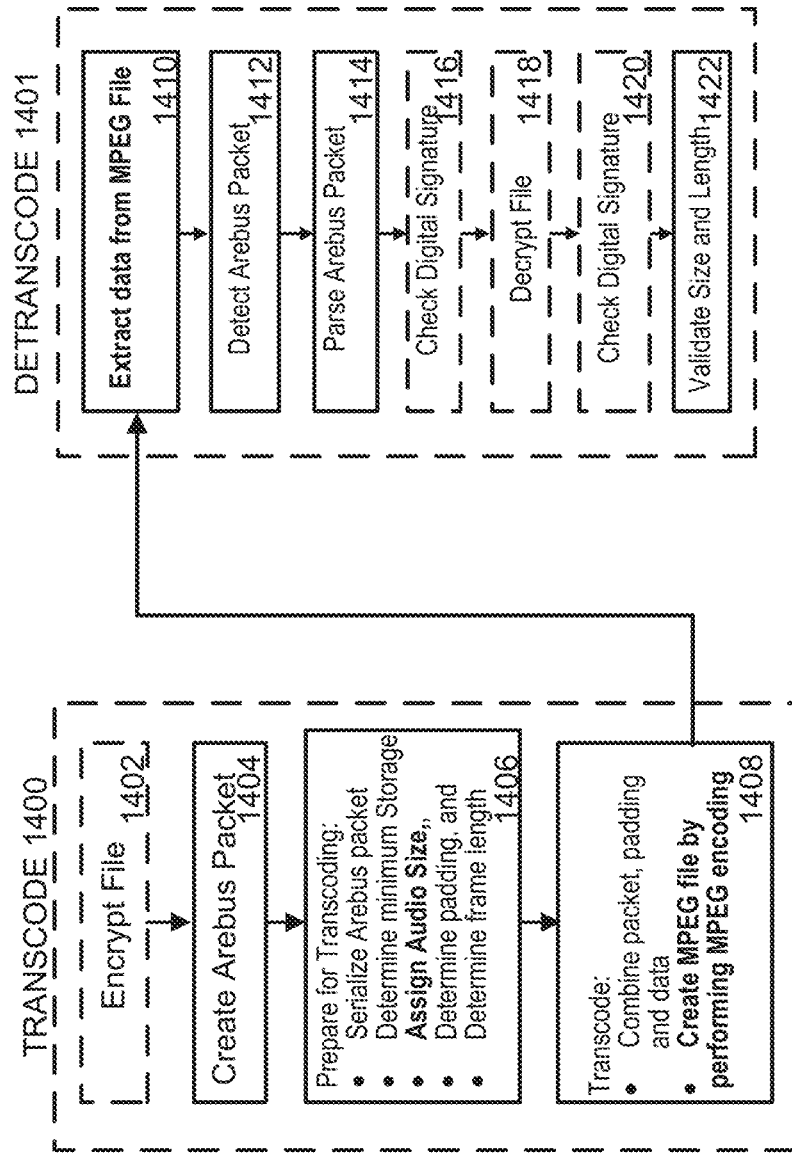
FIG. 14 shows an exemplary flowchart depicting an algorithm for transcoding data as an indecipherable audio file and then detranscoding the data.

Shown in FIG. 14 is an exemplary flowchart depicting an algorithm for transcoding data as an indecipherable audio file and then detranscoding the data. For transcoding Clear Data into an audio file, most of the steps are similar to the steps in the flowchart of FIG. 10. For example, the transcoding phase 1400 performs encryption in optional step 1402, creates an Arebus packet in step 1404, prepares for transcoding by determining properties of the multimedia file in step 1406, performs transcoding based on these determined properties in step 1408, performs detranscoding in the detranscoding phase 1401 by extracting data from the transcoded file in step 1310, detecting the Arebus packet in step 1412, parsing the Arebus packet in step 1414, checking the digital signature in optional step 1416, decrypting the file in necessary in optional step 1418, checking the digital signature in optional step 1420 and validating the size and length of the data in step 1422. If the check in step 1422 validates the Clear Data, the Clear Data is then made accessible to the user.

Figure 8B:
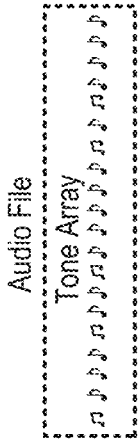
FIG. 8B is an example transcoding Clear Data into an indecipherable audio file, according to an embodiment or portion of an example embodiment.

However, since the data is being transcoded into audio, there are some differences. For example, to transcode the data, the steps in FIG. 8B are used. Specifically, in step 1 of FIG. 8B, a hexadecimal to binary conversion may be performed if needed (i.e., if the data is in hexadecimal format). In step 2, the binary values of 0 and 1 are assigned to an audible tone or note (e.g., binary 0 corresponds to tone A and binary 1 corresponds to tone B). In step 3, the binary file is converted to a tone array which is then converted into a compatible audio file (MP3, MP4, etc.). It should be noted that in step 1 if the data is left in hexadecimal form, then the algorithm in step 2 would simply include/assign a wider range of tones to accommodate all of the hexadecimal possibilities. The opposite (i.e., reverse) process is performed during detranscoding to retrieve the Clear Data. These different transcoding and detranscoding methods occur in steps 1406, 1408, and 1410. It should be noted that if a file format that utilizes compression (e.g., MPEG or MP3) is selected, the Clear Data is supplemented with extra padding (e.g., random bits) to provide enough data to allow compression to take place.

However, different applications and/or services may handle multimedia files in different ways. Some applications, like email, may not alter the multimedia file in any way and transmit the file "as is" to the intended recipient. Other applications, such as social media messaging services, may alter the multimedia file in order to reduce the file size by either compressing and/or resizing the content. For example, when a user upload or sends a picture through Facebook or WhatsApp®, if the file size or dimensions are deemed too large, the service will automatically compress and/or resize the image. This creates complexities when using multimedia files as ways to transfer unaltered raw data or files.

When compressing a multimedia file, parts of the resulting image are at times blurred or "artifacts" may be added due to the compression algorithms used. Depending on which level of compression and algorithm used, the original image may be altered significantly. As an example, if text is overlaid visually onto an image (e.g., drawn on the canvas) to be later recognized by a computer algorithm, if the image is heavily compressed, portions of the resulting image can become distorted, obscuring the added text. This increases the failure rate of the computer algorithm's ability to recognize the text.

A similar issue applies when images are resized. For example, the added text in the original image can be difficult to read or be recognized if the original image is reduced. The information can at times be too small to read. The resizing process may even crop out some of the text entirely.

One example method avoids data loss even if the multimedia file is altered by drawing recognizable characters representing the original data of a file and adding different methods of redundancy (e.g., duplicating or repeating characters in different sizes across an image or animation).

In this example, all content can be represented as a file comprised of hexadecimal values. A transcoder draws/writes these binary or hexadecimal values on an image canvas which is then converted to compatible image format (e.g., GIF, JPG, PNG). These values can also be drawn on multiple canvases, which are converted to frames, which combine to make an animation or video.

The resulting multimedia file can be saved, posted online, or sent through digital transmission (email, messaging, etc.). This multimedia file represents the visual depiction of the raw data of the original content.

The values can be drawn in any shape or pattern, including in a pattern made to resemble existing recognizable images/animations. These values can be drawn on blank new canvases or incorporated/overlaid onto existing images/animations.

Figure 17:
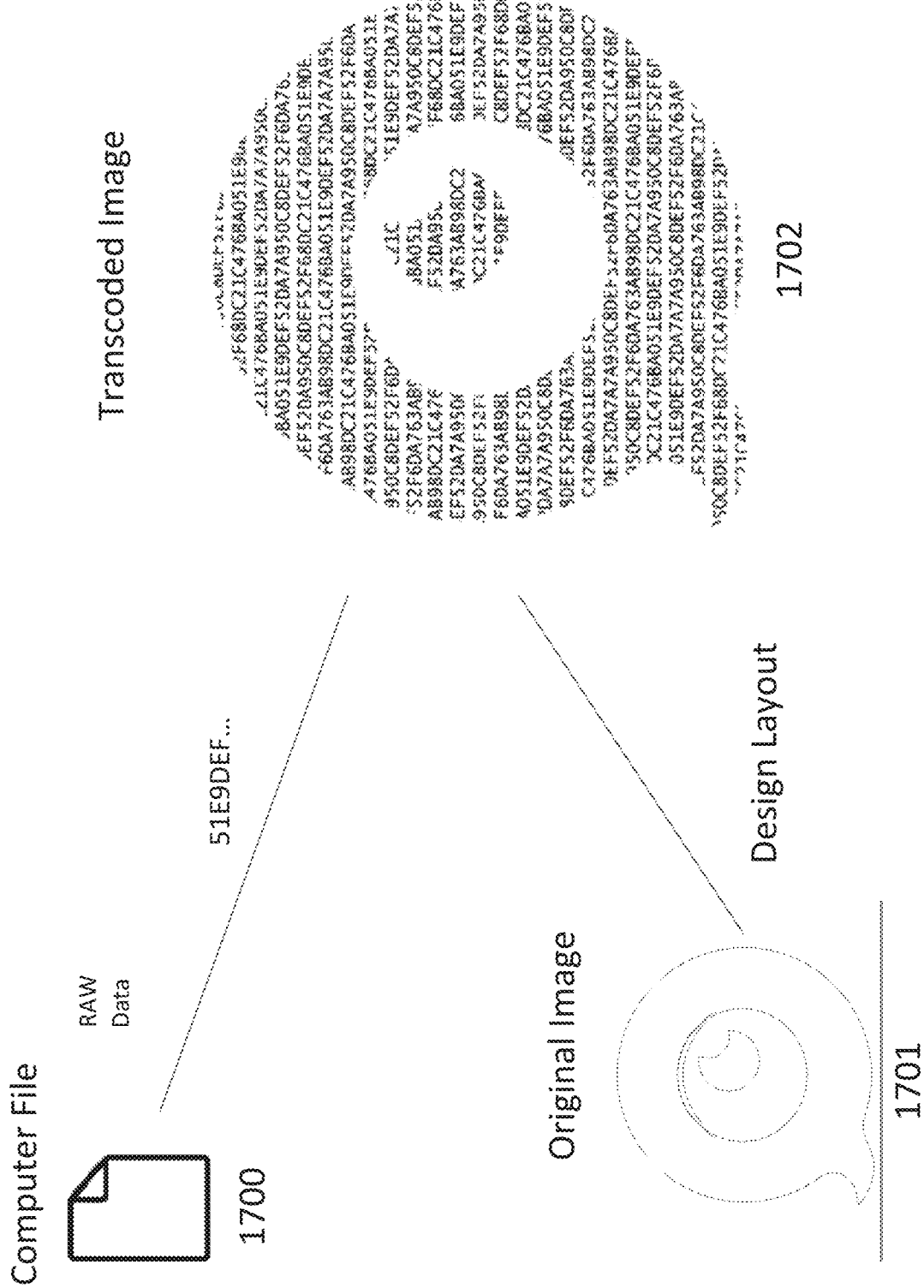
FIG. 17 shows an example of data transcoded in the form of an original image.

As an example, as shown in FIG. 17, the raw data, of a computer file 1700 is extracted and each character (hereafter referred to as "Value") is drawn onto a canvas resembling the design layout image of an original image 1701. The resulting image represents a transcoded image 1702 (hereafter referred to as "Transcoded Picture"). Each Value is drawn until all values are depicted on the image. If needed, randomized characters, or partial characters, as shown in the bottom line of the transcoded image 1702 may be used as "fillers" (hereafter referred to as "Fillers") so that the complete drawing more closely resembles the existing design layout. The system records the data of where Fillers are inserted, and this data is used by the decoder to ignore or "strip-out" these characters during the decoding process. The locations of the Fillers may be sent in header data of the Transcoded Picture or in each image of a Transcoded Animation or Video.

If space on one canvas fills up, if required, a new canvas is created, and the drawing process continues to the new canvas which can either resemble the first design layout of the original image 1701 or of a different image. These canvases can be combined into an animation, with each canvas representing a frame. The Values can be drawn onto existing pictures, images, or frames (hereafter referred to as "Transcoded Animation").

The raw data from the computer file 1700 can be converted or mapped to binary or any other type of characters representing the original raw data. For example, these characters can include a hexadecimal representation of the raw data, or different shapes, symbols, or scripts used for written language (e.g., Arabic, Aramaic, Greek, Armenian, Cyrillic Hebrew, Mesoamerican, Mongolian, Ge'ez, Georgian), computer font types (e.g., GNU Unifont, Anonymous Pro), or preset pixel sequences that can be distinguished from each other. This conversion would happen before drawing the characters on the canvas.

The transcoding example shown in FIG. 17 illustrates an example method where the characters are drawn inside of shapes with white and/or blank space as background (e.g., mapped to the shapes). This is just one of many methods for the transcoding process to depict the existing design layout. Other methods can include drawing the characters around the shape, in the background and/or white space, or even combining the approach where characters can be drawn in the background and/or white space and also drawn inside the shapes. Color and other character tweaks, (e.g., font style, bold, and italics) can be included to differentiate the areas of the transcoded image to more closely resemble the existing design layout.

Figure 18:
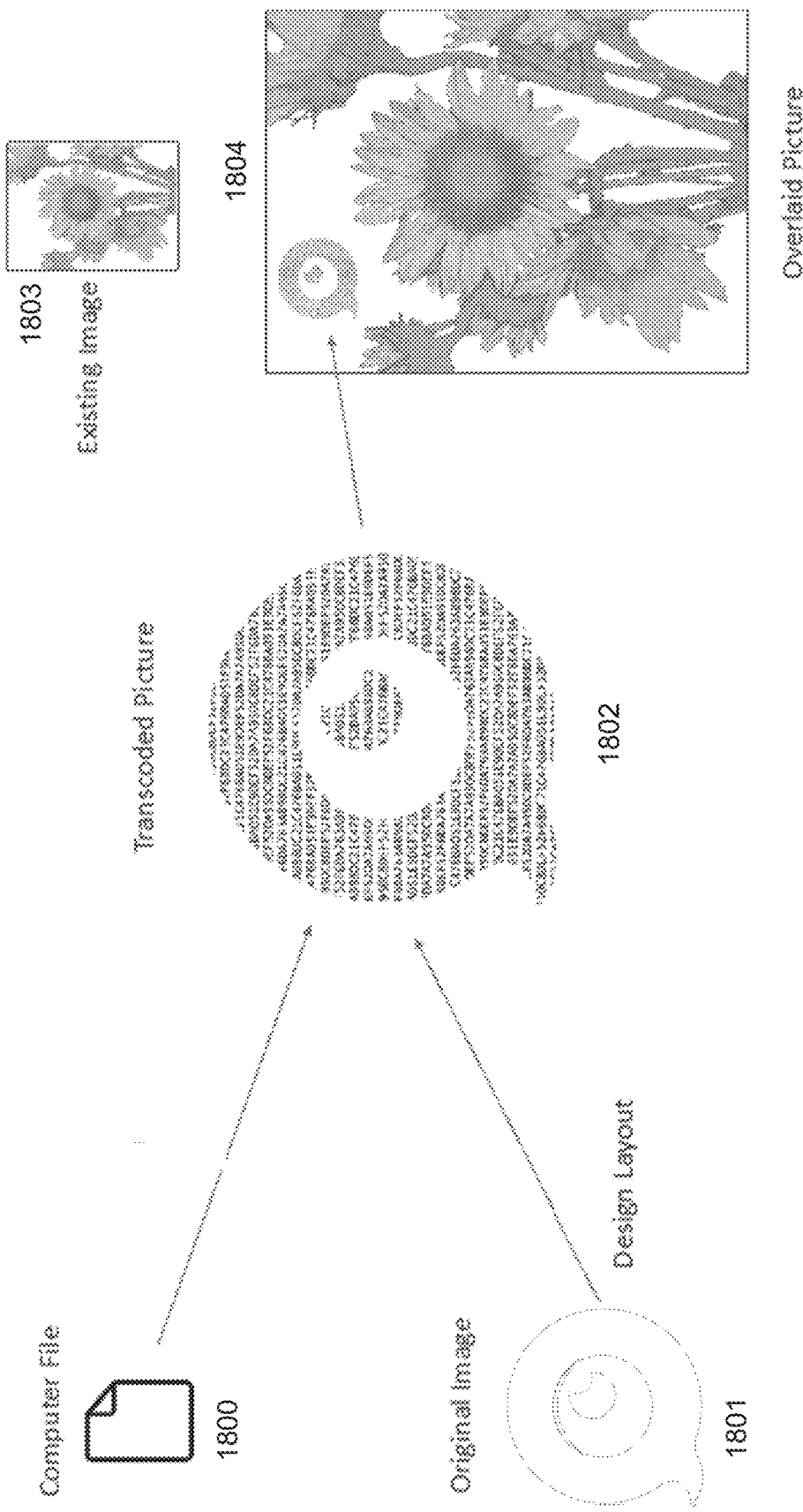
FIG. 18 shows an example of the data transcoded in the form of an original image overlaid on an existing image.

FIG. 18 shows an example where a Transcoded Picture or Transcoded Animation is overlaid onto existing pictures or the frames of existing animations. FIG. 18 depicts how a Transcoded Picture can be overlaid onto an existing image. In this example, the Transcoded Picture 1802, is created and then placed onto the canvas of an existing image 1803, resulting in a new combined image 1804. The transcoded image may be generated in the way described above with reference to FIG. 17. The raw data from a computer file 1800 may be converted into hexadecimal or mapped into another alphabet of symbols and the symbols may be arranged to conform to the design layout of an original image 1801. As with the image in FIG. 17, the mapped data may be augmented with Fillers so that the transcoded image more closely resembles the design layout of the original image 1801.

To add further security, additional randomized characters can be included into the stream of the source file raw data before adding the Filler to make it difficult for third parties to decode these multimedia files. As with the Filler, the example system records the data of where these randomized characters are inserted, and this data is included in the image according to a known protocol and then used by the decoder to ignore or "strip-out" these characters.

For fault tolerance and error correction, in some embodiments, some or all of the initial Values (e.g., the data or mapped data from the data file 1801) can be duplicated and/or repeated across different parts of the canvas or additional canvases. This can be especially useful where the initial Values in parts of an image (or frame in an animation) become difficult to recognize during the decoding process (e.g., as a result of compression, resizing, etc. of the multimedia file). These duplicated Values can be drawn in different ways, for example different font styles, different sizes, different colors, or represented as different shapes/characters, to help with the computer's recognizability of the Values when converted to machine readable data, particularly when the transcoded image is heavily compressed or resized. The system records where these duplicated characters are drawn, and this data is saved into the final transcoded image or animation. During the decoding process, if a Value is difficult to read, the decoder will use this data to find the duplicate Value in the same canvas or another frame and that duplicate Value is used instead.

Figure 19:
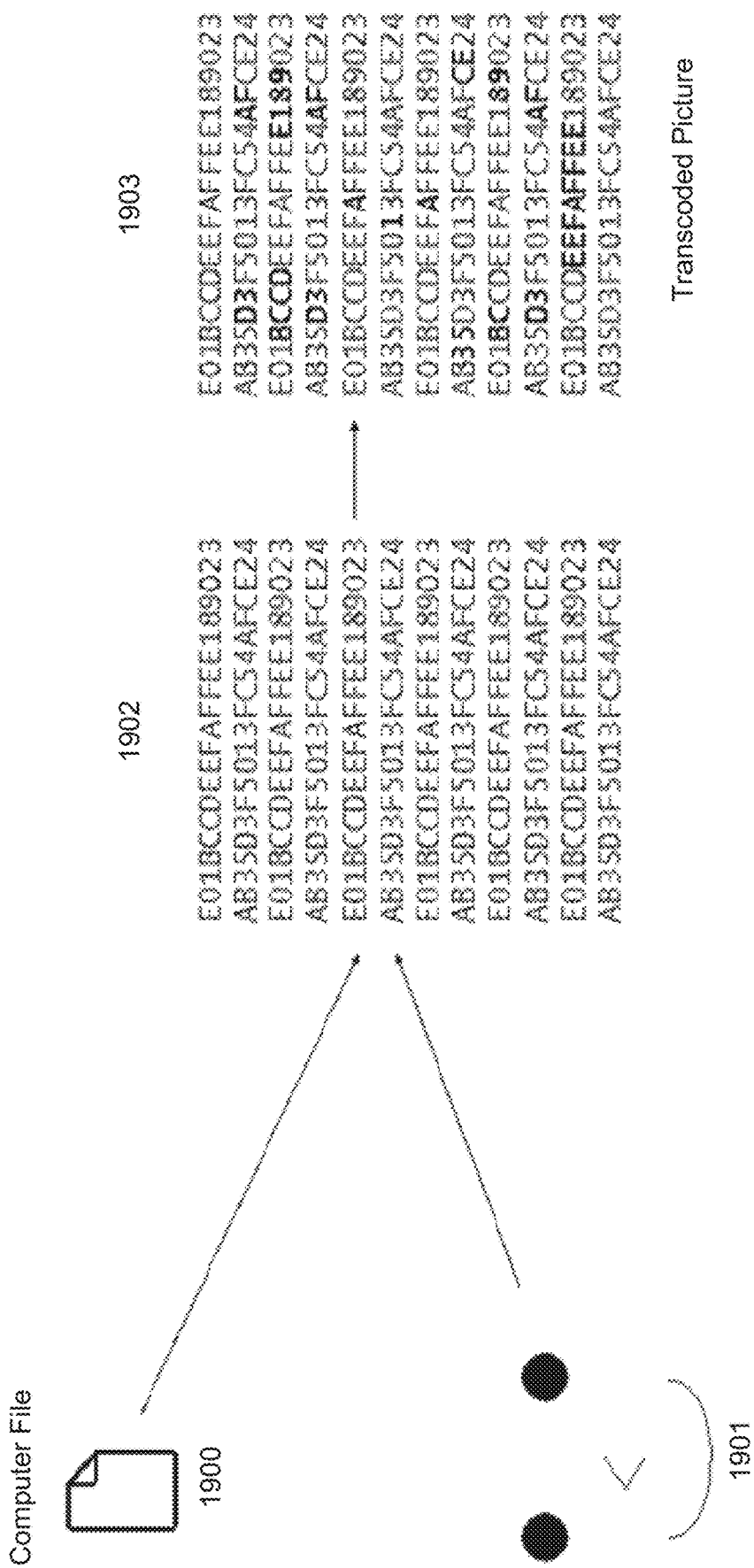
FIG. 19 shows an example of transcoded data including formatting to produce the original image in the transcoded data.

Another example embodiment can be seen in FIG. 19, where the Values from a file 1900 are drawn to cover the entire canvas 1902 and font changes on the drawn characters (such as bold, italics, different colors) are used to depict a design from an original image 1901. The resulting transcoded image 1903 resembles the original image 1901.

Almost all computers and mobile phones have a single or multiple photo gallery or multimedia gallery applications, collectively referred to as "gallery applications." A gallery application may be a native gallery application that comes with the operating system or a third-party application. These gallery applications store multimedia content in a gallery database or memory, referred to herein as a "gallery." Since galleries are used to store personal photos or videos and may be synced to online systems for backup or sharing, these galleries tend to be targets for hackers, creating a privacy vulnerability. Users may protect new or existing content, such as photos, videos, and/or animations stored in the gallery by transcoding the content into a transcoded multimedia file (with or without encryption) and then storing the new content or replacing the existing content in the gallery with the transcoded multimedia file. The content that is transcoded for storage in a gallery is not limited to multimedia files. A user can store other types of content in the gallery by transcoding the content into a multimedia file.

FIGS. 20A and 20B are flowchart diagrams showing use of transcoded multimedia in a gallery. In operation 2000 of FIG. 20A, the user creates or saves multimedia content (e.g., an image, a video or animation with or without an audio component, or an audio file). The user stores multimedia content (which may be one or many photos, videos or other multimedia files) to the gallery using a gallery application in operation 2001. When the multimedia content includes an image or a video, it may be desirable to add a thumbnail image representing the image or video as one of the first images in the multimedia content. This thumbnail image may be quickly detranscoded to determine the contents of the transcoded multimedia file without detranscoding the entire file. The raw data may also be encrypted before transcoding, as described above, to provide additional protection.

After operation 2001, the stored multimedia content may be sent to a data transcoder which transcodes the stored content into a new single transcoded multimedia file, with or without encryption, in operation 2002. In operation 2003, the transcoded multimedia file is sent to the gallery application, the original multimedia content stored in the gallery may be deleted and replaced with the transcoded multimedia file. Alternatively, after operation 2000 in which the user creates or saves multimedia content, in operation 2004, the created or saved content may be sent directly to a data transcoder to be transcoded, with or without encryption, into a new single transcoded multimedia file. This transcoded multimedia file is sent to the gallery application, in operation 2005, for persistent storage in the gallery.

As shown in FIG. 20B, a user is not limited to multimedia files. In operation 2006, a user may create or save other types of data files. In operation 2007, these data files (one or many) may sent to a data transcoder to be transcoded into a new single multimedia file, with or without encryption. This transcoded multimedia file is then sent to a gallery application, in operation 2008, for persistent storage in a gallery.

Additionally, galleries can be used as a mechanism to transfer transcoded multimedia files from one application to another. When a user receives or creates a transcoded multimedia file or other type of file, the file can be saved in a shared gallery, and another application can then access the transcoded multimedia file from the shared gallery and detranscode it, as described below to recover the original file.

Figure 21:
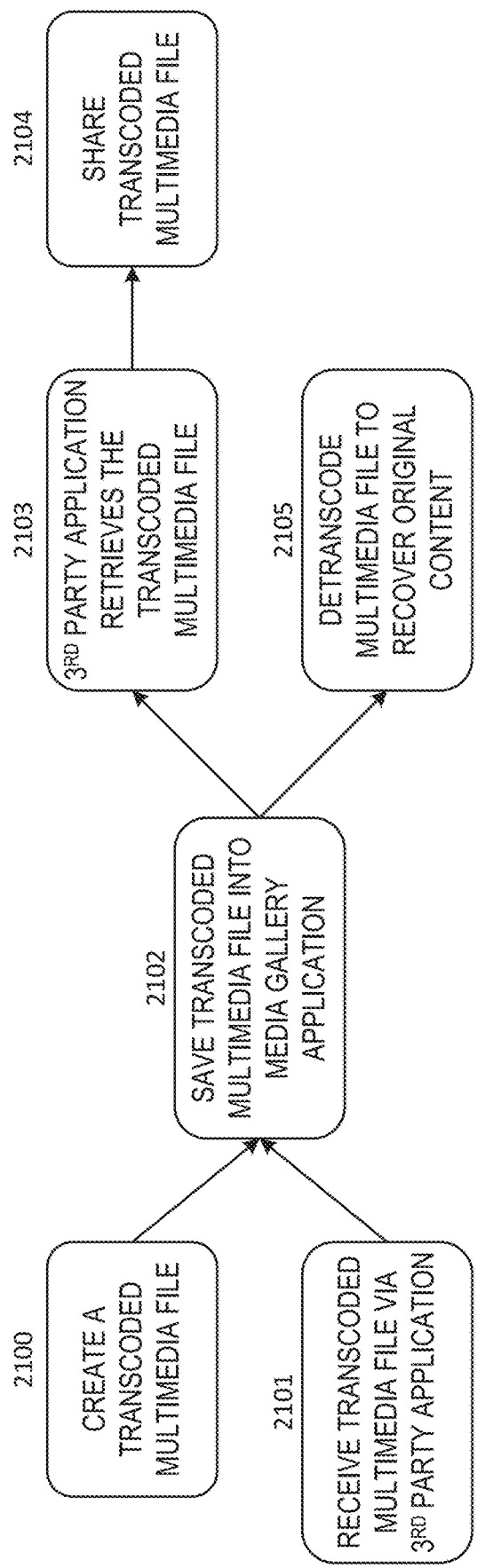
FIG. 21 is a flowchart diagram of an example process for handling a transcoded multimedia file.

FIG. 21 depicts an example workflow for using a gallery application to transfer transcoded multimedia files. A user creates a transcoded multimedia file in operation 2100 or, in operation 2101, the system receives a transcoded multimedia file through a third-party application (e.g., email, messaging, or social media). Operation 2102 saves this transcoded multimedia file to a gallery using a gallery application. The user or another user, in operation 2103, then opens a third-party app which may access the gallery via the gallery application to retrieve the saved transcoded multimedia file. The retrieved transcoded multimedia file may then be shared as shown in operation 2103. Alternatively, after operation 2102, the user or another user with access to the gallery can open a data detranscoder, which, at operation 2105, may access the multimedia file via the gallery application, retrieve the saved transcoded multimedia file, and detranscode the retrieved file to recover the original content. In some embodiments, the detranscoder can scan the canvas of the transcoded multimedia file (e.g., scan an image or individual frames of a video file or animation) generated from the transcoded multimedia file, for example, using computer vision or optical character recognition methods (OCR), to detect and recognize each depicted Value and translate the recognized Values back into the original computer readable format which is then used to reconstruct the original file.

Figure 22:
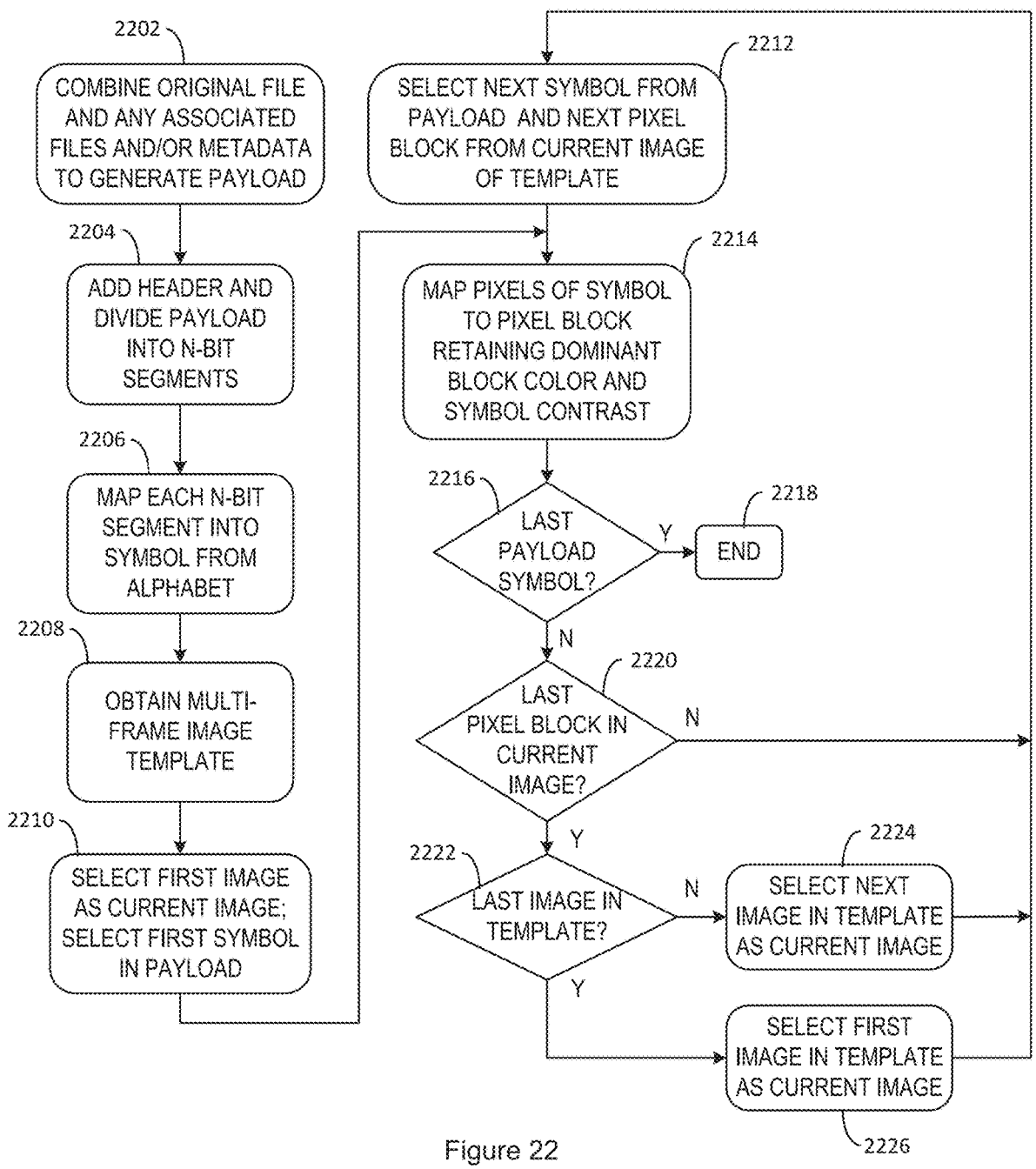
FIG. 22 is a flowchart diagram of an example process for transcoding a clear data file into a multi-frame multimedia file.
Figure 24:
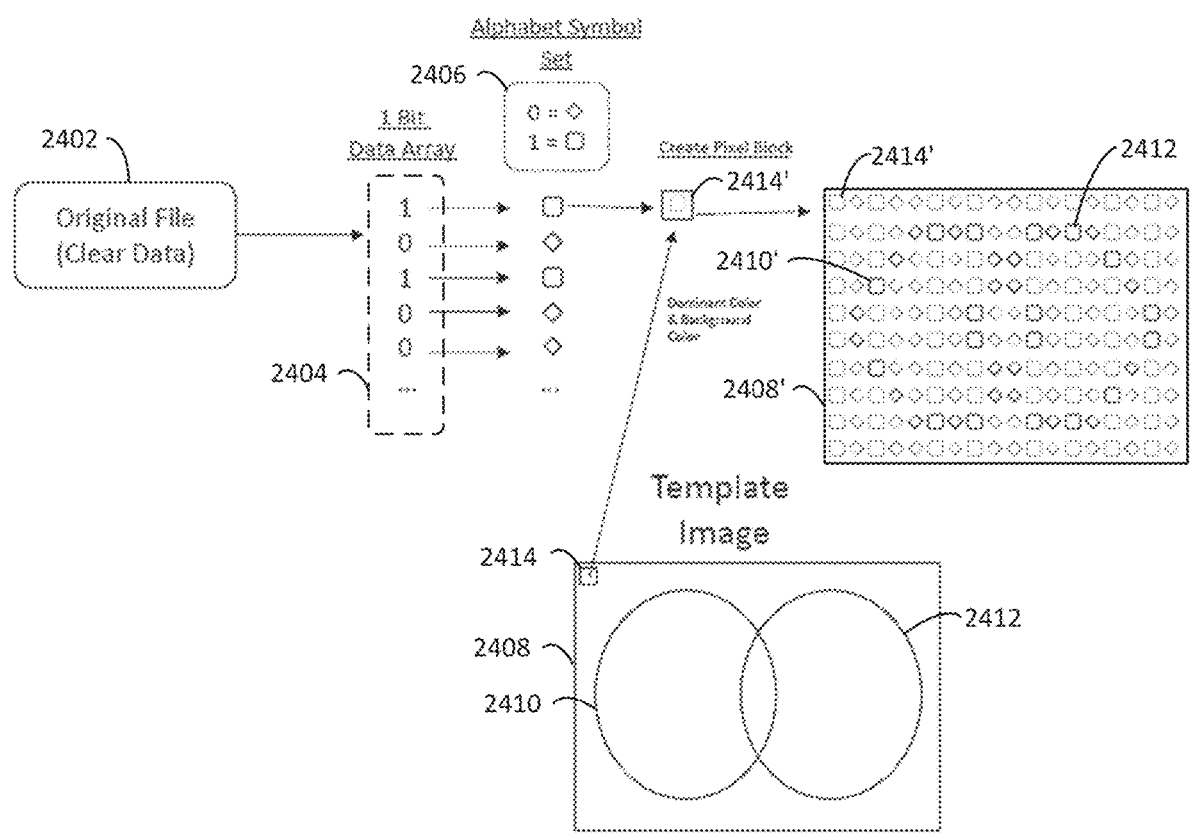
FIG. 24 is a functional block diagram that is useful for describing an example process for transcoding a clear data file using a template image.

Transcoded multimedia files can be created in a method that can imitate existing multimedia images, animations, or videos as shown in FIGS. 22 and 24. Using an animation as an example, the existing animation is analyzed frame-by-frame to create a template of colored pixels. This template may be used as a guide when writing the data to the transcoded multimedia file. As shown in operation 2202, the system combines the original file (multimedia or other data file) with any associated files and/or metadata to generate a payload to be transcoded. Next, operation 2204 generates a header packet, also referred to as an Arebus packet (e.g., a JavaScript Object Notation (JSON) header), describing the combined data and divides the header and the data into N-bit segments. N may be any integer. Step 2206 then maps each N-bit segment into a symbol from an alphabet to generate a stream of symbols (also referred to above as Values) to be written on the canvas to create the transcoded file. The alphabet may be any combination of symbols that includes at least $2^N$ different symbols, each of the $2^N$ symbols corresponding to a respective one of the N-bit values. In an example embodiment, each symbol is represented as an image rendered on the canvas in an M×O block of pixels, where N, M, and O are positive integers. The alphabet may be a recognized alphabet, as described above, or may be a collection of symbols (e.g., pseudo-randomly generated symbols) where the symbols represent different combinations of set and reset bits in an M×O matrix. The examples below concern alphabets having two constraints 1) that no two symbols would be the same or sufficiently similar as to not to be able to be distinguished by the OCR or computer vision process, described above, and 2) that the alphabet does not contain the inverse of any symbol. As described below, in an example embodiment, each symbol is rendered in the transcoded image in two colors, a first color derived from the image and a second color selected to achieve a predetermined contrast with the first color. The first and second colors may be the same but have different brightness levels. Each symbol may be rendered with the first color darker than the second color or vice versa. Thus, each symbol in the alphabet is unique and does not have an inverse in which the first and second colors are switched. The first color may be a foreground color of the pixel block in the transcoded image and the second color may be a background color or vice versa.

At operation 2208, the system obtains a multi-frame image template. Each image in the template includes a plurality of pixels arranged as blocks of M×O pixels. Operation 1120 selects a first image of the template and a first symbol of the payload. In operation 2214, the system maps the pixels of the current symbol in the stream of symbols into the next pixel block. When operation 2214 occurs immediately after operation 2210, this pixel block is the first pixel block in the first image of the template. This mapping process determines a first color and a second color for the pixel block and modifies the brightness of the two colors so that there is a contrast difference between them. In example embodiments, this difference may be greater than zero and less than the maximum brightness value of the template image. In one example, the first color is a most-used color in the block and the second color is a next most used color in the block and the difference in brightness between the two colors is about 20%. When the pixel block has only one color, operation 2214 increases or decreases the brightness of this color to provide the second color. Alternatively, operation 2214 may select another color having a brightness difference with respect to the first color. The symbol is mapped to the pixel block by replacing the pixels in the block with an image of the symbol such that an image of the symbol is rendered in the first color against a background rendered in the second color or vice versa. Alternatively, the first color may be a color that is an average of all the pixels in the selected pixel block of the template. The first color should be used to represent whatever the foreground color is in the symbol of the alphabet. For example, if each symbol in the alphabet is an 8×8 image having 64 pixels and a particular symbol has 40 black pixels and 24 white pixels, then the 40 black pixels would become the first template color. The transcoding process would then apply the second color of the pixel block for the 24 white pixels of the symbol.

Operation 2216 then determines if the last symbol in the symbol sequence has been mapped. If it has, the transcoding process is at an end, as shown by operation 2218. If there are more symbols in the sequence, control passes to operation 2220 which determines whether the pixel block that was just mapped is the last block in the current image. If it was, then operation 2222 determines whether the current image is the last image in the multi-frame image template. If the current image is the last image in the template, the transcoding process resets to the first image in the template. Thus, for large files, the transcoded multimedia file may include multiple concatenated instances of the template, each instance mapped with different symbols from the symbol stream.

Returning to operation 2220, when the current block is not the last block in the current image, the transcoding process transfers control to operation 2212 which selects the next symbol from the payload symbol stream and the next pixel block from the current image of the template and transfers control to operation 2214, described above.

When, at operation 2222, it is determined that the current image is not the last image in the template, operation 2224 selects the next image in the template as the current image and transfers control to operation 2212 so that symbols in the symbol stream can be mapped into the pixel blocks of that image to produce the transcoded multimedia file.

FIG. 24 is a functional block diagram that illustrates an example transcoding of a single image. In this example, N=1, M=5, and O=5 thus, the original clear data file 2402 is partitioned into a bit array 2404 and each bit in the bit array 2404 is mapped into one of two symbols, using an alphabet 2406 that includes two symbols, a diamond—representing a zero-valued bit, and a square—representing a one-valued bit. As shown in FIG. 24, the transcoding process selects a block 2414 of 5×5 pixels from an image template 2408. In this example, the template is a monochrome image of two ellipses, 2410 and 2412. The transcoding process then determines the first color and second color to be used in the transcoded image from the 5×5 block of pixels 2414 and maps the symbol, in this case a square representing the first one-valued bit of the bitstream, into a 5×5 block of pixels which forms the corresponding block 2414' in the transcoded image 2408'.

As shown in FIG. 24, the example template image includes an image of two ellipses 2410 and 2412 which are black against a white background. In this instance, the first color is white and most of the pixels in the square alphabet symbol are also white. There is no other color in the pixel block 2414 so, in this example, the transcoding process selects a color having a 20% brightness difference from the first color, in this case, gray as the second color. Thus, the transcoding algorithm selects white as the first color and gray as the second color to render a gray square on a white background. When the block of pixels intersects one of the ellipses 2410 or 2412, the first color may still be white, but the second color is black. Thus, the symbols mapped to the pixel blocks of the ellipses 2410' and 2412' in the transcoded image 2408' that correspond to the ellipses 2410 and 2412 of the template image 2408 are rendered with white as the first color and black as the second color.

Figure 23:
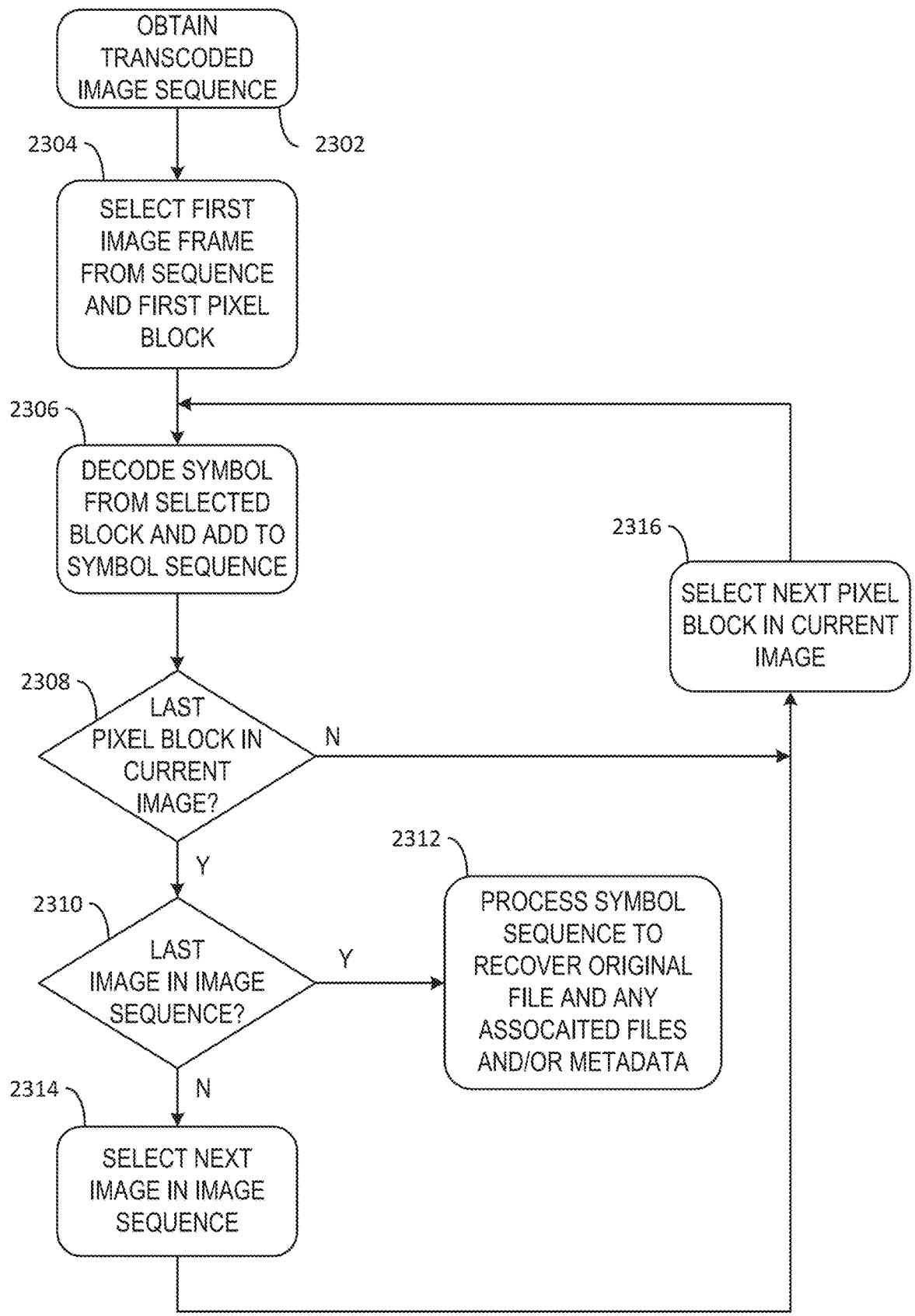
FIG. 23 is a flowchart diagram of an example process for detranscoding a transcoded multimedia file to recover the clear data file.

FIG. 23 is a flowchart diagram illustrating the detranscoding process. At operation 2302, the process obtains a transcoded image sequence. Operation 2304 then selects a first image frame from the sequence and a first pixel block from the selected image. Operation 2306 then decodes the symbol in the block. This process may, for example, convert the block to black and white by mapping the foreground color to white and background color to black or vice versa, and then correlating the block to each alphabet symbol and its inverse, selecting the alphabet symbol having the greatest correlation as the decoded symbol. This correlation may be between pixel values of the pixel block and the symbol or between other characteristics, such as spatial frequency values. Alternatively, OCR or machine vision techniques may be applied, as described above, to recognize the symbols.

An example decoding process may have some error correcting properties. For example, the alphabet may be processed to eliminate similar symbols (e.g., symbols that have a high cross-correlation), for example if the alphabet includes Roman characters one of "P" or "R" may be eliminated. In addition, if there are no image artifacts, then each tile should only be represented by 2 colors. When the pixel block contains more than 2 colors, the process determines which color is the first color and which color is the second color. For a pixel having a color other than the first color and second color, the detranscoding process may calculate a color distance of the pixel from each of the first and second colors and reassign the color of the pixel to the closer color. In addition, as described above, there may be error correcting properties in the original bit stream, for example, the bit-stream may include Reed-Solomon coding or be repeated.

Returning to FIG. 23, after operation 2306 decodes (e.g., recognizes) the symbol in the current pixel block and adds the decoded symbol to the symbol sequence, operation 2308 determines if the current pixel block is the last block in the current image. If it is, then operation 2310 determines if the current image is the last image in the image sequence. If there are no more images in the image sequence, then the symbol sequence is complete and the detranscoding process executes operation 2312 which maps the symbol sequence to recover the N-bit values and processes the N-bit values to recover the header packet. In some embodiments, the header packet includes information on the size and starting N-bit value of each file and one or more verification values (e.g., checksums or cyclic redundancy codes (CRCs)) that may be used to ensure that the file data was correctly detranscoded.

In an example embodiment, operation 2312 may parse the beginning of the data stream to determine if it represents a header packet, (e.g., a JSON header packet). Since the header is small, this may be a brute force correlation based on the first 1000 or fewer bytes of the sequence. Alternatively, knowing the structure of the header, the detranscoding process may use a syntax-based method to identify components of the header packet. The decoding process may employ multithreading. Since the transcoded multimedia file is a multiframe file, multiple frames can be detranscoded in parallel in respective threads.

As described above, the example transcoding process maps raw data to an alphabet comprising a symbol library in which each symbol is rendered in two-color pixel blocks across canvases representing the frames of an original animation or video. Colors for the background and foreground character are determined using the template. These canvases are then combined into the new transcoded multimedia file. The resulting animation resembles the original animation or video. In these embodiments, the computer vision/OCR system can be combined with other techniques, for example machine learning, to increase the effectiveness of the detection and recognition of difficult to read symbols. The system can be "taught" (or optimized) to recognize a specific font or character set used to draw the symbols on a canvas. Also, when used with the fault tolerance methodology, the decoding algorithm can learn and/or adapt from failed recognition attempts of symbols by adjusting the recognition algorithm to account for the distortions encountered. In embodiments using machine learning, when the recognition of a symbol fails, the decoder may pull the correct data from the duplicated symbol and adapt the recognition algorithm to include the visual alterations encountered from the original failed symbol recognition attempt to improve the computer vision/OCR algorithms for better recognition.

Embodiments described above generally relate to using the spatial domain of a template file to encode clear data. The above embodiments also generally relate to using the spatial domain encodings to generate images, videos, sounds, etc. that are indecipherable to human senses. As described herein above, colors and pixels, among other spatial properties, within a template file (e.g., an image) are mapped into new values based on input, clear data. The mapping is based on a representation in the spatial domain. Nonetheless, other encoding domains are possible. For example, a frequency domain can be used as further described herein below. Generally, an encoding domain allows mapping of a template file into a representation and the use of one or more algorithms to combine, update, or edit this representation to encode clear data. The encoding domain can be defined using the mapping and/or the algorithm(s).

FIGS. 25-30 illustrate and describe using many of the above-discussed systems and methods in conjunction with an encoding process that utilizes a frequency domain. Thus, embodiments that encode files using a frequency domain-based approach transcode clear data into a different aspect of the template file, that is not closely tied to visual characteristics as in the case of using a spatial domain. Systems and methods that use a frequency domain for encoding data are capable of mapping a transformation of template file elements to an alphabet, the alphabet representative of clear data values for encoding, to generate a new file that appears similar to the original template file. In other words, in certain situations, relative to using a spatial domain, using a frequency domain representation can improve the representation of clear data's encoding using a template file because the resulting file can be more similar (e.g., less altered) to the template file. For example, the resulting file is a multimedia file (e.g., an image, a GIF, a video, an animation, an audio file, etc.). The multimedia file can be transmitted from a source device to a destination device, where the transmission compresses the multimedia file (e.g., to reduce its file size). The compression can be lossy and, hence, can alter the appearance of the file (e.g., the visual or audible appearance when it is presented at the destination device). If the multimedia file is altered substantially due to the compression, then the decoding process apply thereto to decode and output the encoded clearly data may fail. In such situations, the use of the frequency domain representation can have a better performance than the spatial domain (e.g., can be more resilient to decoding failures). Of course, the use of multiple encoding domains, such as a combination of both the spatial domain and the frequency domain, are possible.

The above encoding systems can be used for the frequency domain encoding. In particular, a template file is selected, its content analyzed to extract aspects and attributes of elements of the template file. A new file is then generated, and this file appears similar to the original template file but includes encoded data. This is done by applying a transformation of the file elements using a mapping algorithm against an alphabet representing the data values from the clear data to encode.

Descriptions of how an alphabet may be used in the above-described embodiments have already been provided. In a similar way, the idea of an alphabet may also be used in frequency domain encoding of clear data.

In an example, an alphabet is a one-to-one mapping between characters and signatures. Characters are unique/distinct sets of bits having a constant or a variable length and can be used to uniquely represent given binary data. In other words, an alphabet may contain enough distinct characters so that a given binary data can be uniquely split into an ordered set of characters. For example, one can define a total of two-hundred fifty-six characters with eight bits (one byte) and map each character to a unique byte of data. Signatures are also unique/distinct sets of bits having a constant or a variable length that are in one-to-one correspondence with characters. Signatures, in essence, define an alternative representation of given data and have desirable properties absent in the original character representation. An example of such property is data redundancy in signature representation (e.g., if eight-bit characters are mapped to twenty-bit signatures), which can be used for later data recovery if the data is being transmitted via a noisy channel.

In an example, a mathematical representation of a signal is a one-dimensional function of space or time, which is generally referred to as the spatial or time domain. But signals, periodic or not, can be broken down into individual frequency components which combined represent the original signal. Such frequency-amplitude representation of a signal is called the frequency domain. Thus, since many above embodiments describe how a spatial domain (i.e., time domain) may be used when encoding clear data, similar methods can be used to further break the spatial domain down into a frequency domain, which may also be used to encode clear data.

By way of example, images can be thought of as kind of a discrete signal where each pixel or point in a two-dimensional space has associated values (e.g., pixel luminance). Such representation of an image may be referred to as spatial domain representation or a spatial domain. Similar considerations can be applied to more than images (e.g., an audio file being used as a template file) to allow them to be represented with a set of frequency-amplitude values (e.g., frequency domain representation). One reason for applying frequency transformations to clear data (e.g., an image, audio file, video file, text document, GIF, etc.) is to exploit various characteristics of which are impractical, impossible, or less advantageous to utilize in other encoding domains. Various systems and methods may be utilized for converting clear data into a frequency domain, as discussed in more detail in the disclosed embodiments.

Figure 25:
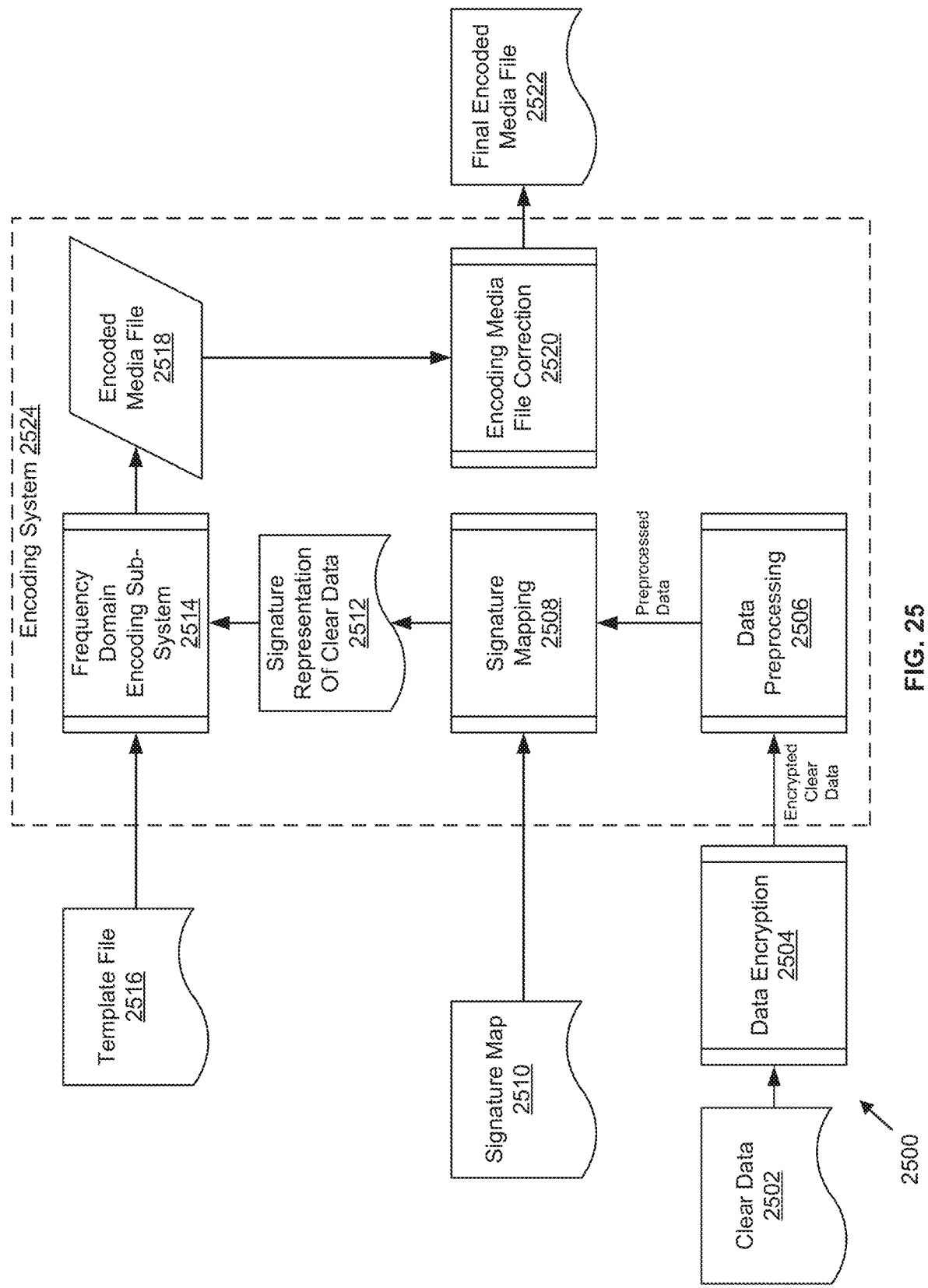
FIG. 25 is an illustration of a system for encoding data according to an embodiment.

FIG. 25 is an illustration of a system for encoding data according to an embodiment. The embodiment allows for clear data to be transcoded into the frequency domain of a template file and does not need to be completely tied to the visual characteristics of the template file.

Embodiments described herein, and in further detail below allow for a template file 2516 to be analyzed, so that aspects and attributes of the template file 2516 (e.g., elements of an image) may be transformed into a frequency domain, mapped to an alphabet that is representative of clear data 2502 values, and then be encoded into a final encoded media file 2522. The template file 2516 can be of a file type, such as by being an image file, a video file, a graphic file, a text file, an audio file, or any other file types. The template file 2516 can be selected based on user input from a library of template files or, more generally, from pre-stored files in a memory.

System 2500 illustrates an embodiment where clear data 2502, a signature map 2510, and a template 2516 are used to generate a final encoded media file.

Clear data 2502 can be the same as the clear data described in the above embodiments. Clear data 2502 may be obtained from a user interface of a user device and may take the form of a text file, a video file, a sound file, an image, a GIF, etc. Further, how clear data 2502 may optionally be subjected to data encryption 2504 prior to transcoding as described in the above embodiments.

Clear data 2502 and/or encrypted clear data (e.g., output from data encryption 2504) may be subjected to a data preprocessing 2506 system. The data preprocessing 2506 system may be capable of improving data resiliency to protect the integrity of the data while at rest and/or during transit. Such data resiliency protections may be aimed at detecting changes to data and/or correcting changes made to data, whether the changes to the data were made accidentally during signal processing or intentionally by a malicious actor. In an embodiment, the data preprocessing 2506 system preprocess clear data 2502 and/or encrypted data after data encryption 2504 to add redundancy. In an embodiment, the data preprocessing 2506 system preprocess clear data 2502 and/or encrypted data after data encryption 2504 by using checksums or message authentication codes. In an embodiment, the data preprocessing 2506 system preprocess clear data 2502 and/or encrypted data after data encryption 2504 by incorporating error correction codes (e.g., block codes, convolutional codes).

Once any processed data is generated from data processing 2506, a signature mapping 2508 occurs in system 2500. Portions of preprocessed data from data preprocessing 2506 can be uniquely split into an ordered set of characters, then the characters can be mapped to signatures in a signature map 2510 during a signature mapping 2508. In an embodiment, the mapping of characters to signatures is a one character to one signature, signature mapping 2508.

The signature map 2510 is used to perform a signature mapping 2508 of characters, that correlate data to signatures. Mapping and using an alphabet, have already been described above in relation to the spatial domain encoding systems and methods. Mapping can be used in a similar way in the systems and methods for frequency domain encoding. In the spatial domain encoding, the raw data from the computer file could be converted or mapped to binary or any other type of characters representing the original raw data. Similarly, embodiments performing frequency domain encoding can use clear data 2502, encrypted data from data encryption 2504, or preprocessed data after data preprocessing 2506 along with a signature map 2510 to perform signature mapping 2508 and generate a signature representation of clear data 2512.

In an embodiment, encrypted data is fed into the signature mapping 2508 system without first being preprocessed by the data preprocessing 2506 system. In an embodiment, clear data 2502 is fed into the signature mapping 2508 system without first being subjected to data encryption 2504 or data preprocessing 2506.

Once a signature mapping 2508 has occurred, a signature representation of clear data 2512 is produced. In an embodiment, the signature representation of clear data 2512 represents encrypted data (i.e., data from data encryption 2504) which in turn is representative of the clear data 2502. In an embodiment, the signature representation of clear data 2512 represents the preprocessed data (i.e., data from data preprocessing 2506), which in turn may be representative of either encrypted clear data or non-encrypted clear data 2502.

In an embodiment, a frequency domain encoding subsystem 2514 is capable of using the signature representation of clear data 2512 and a template file 2516 in order to produce an encoded media file 2518.

Figure 26:
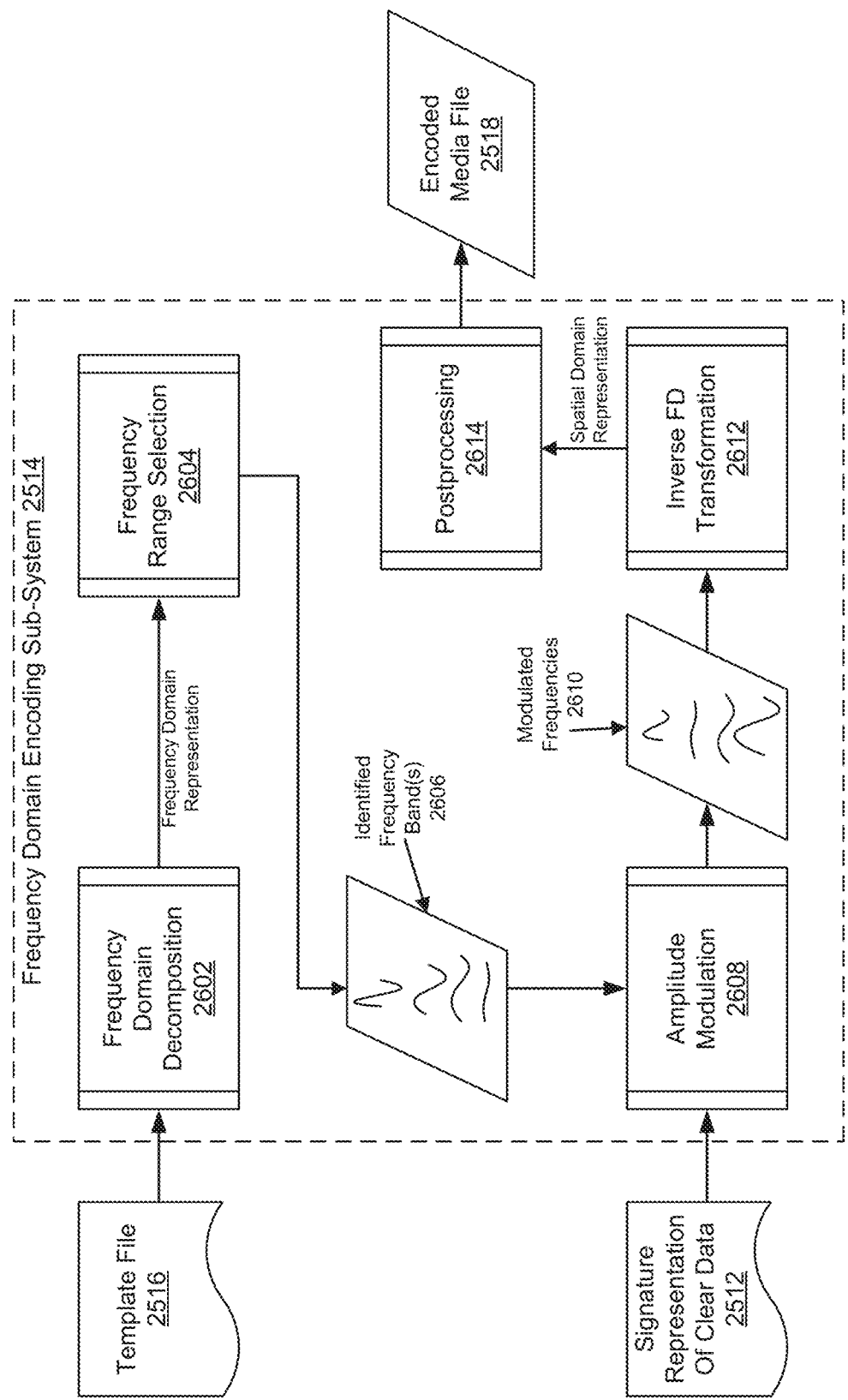
FIG. 26 is an illustration of a system used when encoding data according to an embodiment.

An embodiment of the frequency domain encoding subsystem 2514 is illustrated in more detail in FIG. 26. Therefore, system 2600 will be described in further detail before further describing how an encoded media file 2518 may be used in system 2500.

In an embodiment of system 2600, a template file 2516 is used to perform frequency domain decomposition 2602. The template file 2516 may be an image file, video file, audio file, etc. In an embodiment, the template file 2516 is user selected. In an embodiment, the user can choose any template file 2516 available to their user device. In an embodiment, the template file 2516 is stored on the user device or is available to the device via a computing service (e.g., cloud service). In an embodiment, the template file 2516 is chosen by the user from a predefined set of template files that the user may choose from. In an embodiment, the template file 2516 may be of a certain quality so that if an encoded media file 2518 size, is large, it would not raise suspicion as to why the encoded media file 2518 size is large.

During frequency domain decomposition 2602 a frequency domain representation of a portion of the template file 2516 is obtained. The frequency domain representation is capable of obtaining frequency bands 2606 from the template file 2516 by using a frequency domain algorithm.

In an embodiment, the portion of the template file 2516 may include the entire template file 2516 (e.g., all regions). In an embodiment, the portion of the template file 2516 may include less than the entire template file 2516 (e.g., one or more regions of the template file). In an embodiment, obtaining the frequency domain representation of the template file 2516 uses one or more pixel channels. In an embodiment, the frequency domain algorithm that is used during frequency domain decomposition 2602 depends on the requirements of an application that is being used to send the encoded media file 2518. For example, an application that can be used to send the encoded media file 2518 may use frequency domain algorithms that compress data in a way that is less harmful to encoded data if a certain frequency domain algorithm is used (e.g., selecting a frequency domain algorithm to be used during frequency domain decomposition 2602 based on an application that is being used to send the final encoded media file). In an embodiment, the frequency domain algorithm that is used during frequency domain decomposition 2602 depends on the requirements of an application that is being used to send the final encoded media file. In an embodiment, the frequency domain algorithm that is used during frequency domain decomposition 2602 is selected from a set of frequency domain algorithms available to be used during frequency domain decomposition 2602.

In an embodiment, frequency domain decomposition 2602 is performed using the template file 2516. In an embodiment, the user device stores the result of the frequency domain decomposition 2602 on the user device for later use to reduce processing time and resources for future use of the same template 2516. In an embodiment, the user device receives a template file 2516 for the user to view and/or hear while also receiving the frequency domain representation (i.e., what would be the output from the frequency domain decomposition 2602) from a computing service (e.g., computing service) in order to reduce the processing that takes place on the user device.

The frequency domain representation of a spatial domain (e.g., converting an image into a frequency domain) can be obtained by using algorithms such as Discrete Cosine Transform (DCT), Discrete Wavelet Transforms (DWT), and Discrete Fourier Transforms (DFT), etc.

Once the frequency domain representation of the template file 2516 is obtained, the frequency domain representation contains frequency bands. Frequency bands may be used during frequency range selection 2604. During frequency range selection 2604, frequency bands from the frequency domain representation of the template file 2516 can be identified for modulation to obtain identified frequency bands 2606. In an embodiment, the frequency bands may be identified using one or more methods. In an embodiment, the frequency bands are identified using a pseudo-random, predefined, or adaptive decision. In an embodiment, the decision as to which identification method is used is based on characteristics of the template file 2516, such as image quality, data resilience, etc. Further, in an embodiment, the adaptive approach for identifying frequency bands is enhanced by applying machine learning techniques to train and use a model for selecting the best frequency band(s) for modulation. In an embodiment, more than one identification method is used. For example, an embodiment may be capable of using two or more frequency band identification methods and determining if there is a majority consensus among the methods. In an embodiment, the identified frequency bands 2606 are stored so that processing of the same template file 2516 is reduced at a later point in time. In an embodiment, the identified frequency bands 2606 of the template file 2516 are already known because the template file 2516 has been used before or because the identified frequency bands 2606 have been obtained from a computing service. If the identified frequency bands 2606 are retrieved from storage of the user device or from storage of a computing service, then the frequency domain decomposition 2602 system would not be necessary in an embodiment.

Once the frequency bands are identified, the identified frequency bands 2606 (represented by block 2606) are used by an amplitude modulation 2608 system in an embodiment system 2600. The amplitude modulation 2608 system may be capable of using the identified frequency bands 2606 and the signature representation of clear data 2512 to generate modulated frequencies 2610. Modulated frequencies 2610 may be generated using a modulation function to modulate the identified frequency bands 2606 with the signature representation of the preprocessed data 2512. In an embodiment, the modulation function that is used is based on the requirements of the application performing the modulation and/or the application being used to send the encoded media file 2518 (or final encoded media file). In an embodiment, the modulation function is an adaptive function that may depend on certain conditions (e.g., frequency range). In an embodiment, the modulation function that is used is determined by a machine learning model. In an embodiment, a machine learning model performs the whole modulation step and therefore produces modulated frequencies as an output. In an embodiment, the machine learning model may be operating on the user device or on a computing service device.

Modulated frequencies 2610 produced by the amplitude modulation 2608 may be represented by block 2610. The modulated frequencies 2610 may then be converted back to the spatial domain by applying an inverse frequency domain (FD) transformation 2612. In other words, a spatial domain representation of the modulated frequencies 2610 is generated by using an inverse frequency domain transform 2612 on the modulated frequencies 2610. Examples of algorithms that may be used to convert a frequency domain into a spatial domain are inverses of algorithms that may be used to covert a spatial domain representation into a frequency domain (e.g., the inverse algorithm of a Discrete Cosine Transform (DCT), Discrete Wavelet Transforms (DWT), and Discrete Fourier Transforms (DFT), etc.).

Once a spatial domain representation of the modulated frequencies has been generated, postprocessing 2614 occurs in example embodiment, system 2600. Postprocessing 2614 may not occur in some embodiments. Postprocessing 2614 may consist of spatial domain normalization, color quantization, or other processing that is performed on the spatial domain representation (obtained from the inverse frequency domain transformation 2612) of the modulated frequencies 2610 before an encoded media file 2518 is further processed or sent to a second device and/or second application.

In an embodiment, postprocessing 2614 comprises normalizing the spatial domain representation of the modulated frequencies 2610. In an embodiment, the spatial domain representation of the encoded image may contain values outside an allowed range of pixel values. For instance, if a luminance channel was chosen during frequency domain decomposition 2602 for encoding (with an allowed value range of [0, 1]), the spatial domain representation of that channel might contain negative values or values greater than 1. Thus, the obtained luminance values must be mapped to the [0, 1] range (i.e., normalized). The choice of a normalization function can result in encoded data damage. In an embodiment, depending on the encoded media file 2518 requirements or final media file requirements, the normalization technique will decrease the precision of pixel values (e.g., choose a smaller floating-point data type, round floating-point values to integers (e.g., HSL to RGB conversion), etc.).

In an embodiment, postprocessing 2614, alternatively or additionally, comprises color quantization. In some embodiments, the data transcoding process may result in an increase of unique colors in the spatial domain (e.g., if the template file 2516 was an image, GIF, video, etc.). In other words, more unique colors than were in the template file 2516 may exist in the spatial domain representation of the modulated frequencies 2610. In such embodiments, the increase in unique colors can be problematic (e.g., where the resulting image or video format has a limitation on the number of colors, where the resulting video size is too large, etc.). Therefore, in an embodiment, a color quantization algorithm may be applied to the spatial domain representation of the modulated frequencies 2610. In an embodiment, the color quantization algorithm used depends on the performance of the algorithm and/or the impact it has on the encoded data. In an embodiment, a machine learning model may be used to determine a color quantization algorithm to be applied. In an embodiment, the color quantization algorithm may be predefined, may be used on every spatial domain representation of the modulated frequencies, and/or may be used based on certain conditions being true, etc.

After the spatial domain representation of the modulated frequencies goes through any postprocessing 2614 steps that may occur in some embodiment, the output of the postprocessing 2614 can be considered as an encoded media file 2518. In some embodiments, the spatial domain representation of the modulated frequencies 2610 does not go through postprocessing 2614 and is therefore representative of the encoded media file 2518.

Referring back to system 2500, the encoded media file 2518 produced by the frequency domain encoding subsystem 2514 may then be subjected to encoding media file correction 2520. The encoding media file correction 2520 system may apply corrections to the encoded media file. Various corrections may be applied to the encoded media file 2518. In an embodiment, the corrections made by the encoding media file correction 2518 system encode the media file based on the buffer of pixels obtained so far. In an embodiment, the encoding media file correction 2520 system introduced corrections to transcoded data quality and/or image quality. In an example, the encoded data quality is impacted, so a correction is applied by reiterating encoding steps on the already encoded file (e.g., image). In an embodiment, if the transcoded file is an image and has low fidelity compared to the original one, quality is improved by adjusting the channels of the image which have not been used for transcoding. In an embodiment, some or all corrections performed by one or more encoding media file correction 2520 systems are performed by a computing service. In an embodiment, corrections are performed on some encoded media files 2518, but not all encoded media files 2518. In some embodiments, the encoded media file 2518 is not subjected to encoding media file correction 2520 and is therefore the same file (i.e., same data) as the final encoded media file 2522.

Figure 27:
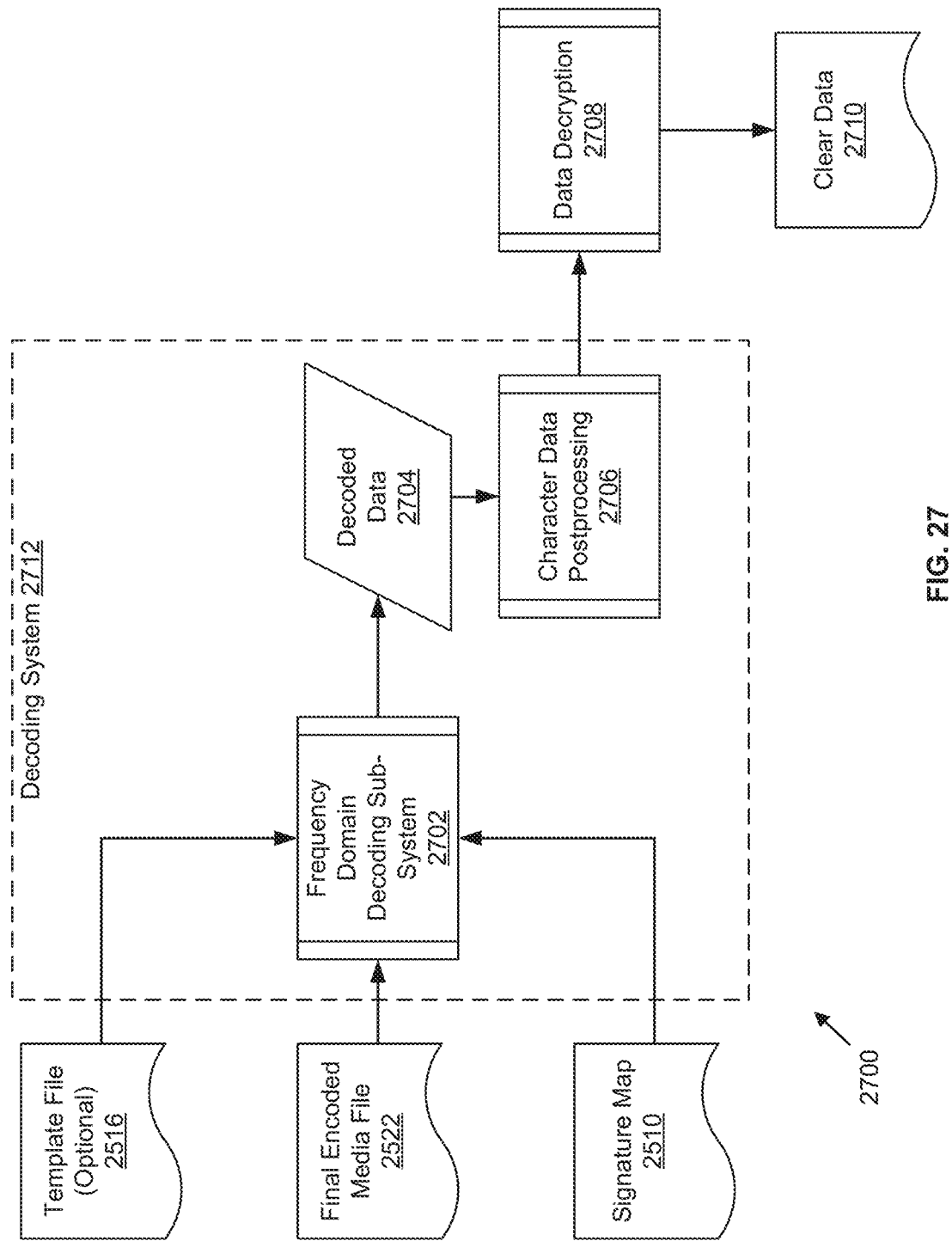
FIG. 27 is an illustration of a system for decoding data according to an embodiment.

FIG. 27 is an illustration of a system for decoding data according to an embodiment. System 2700 may use a signature map 2510 and final encoded media file 2522 to obtain the clear data 2710 encoded within the final encoded media file 2522. In an embodiment, a template file 2516 is used in the systems and methods for obtaining clear data 2710 from a final encoded media file 2522.

The final encoded media file 2522 may be the final encoded media file 2522 produced by the embodiments described with respect to system 2500. Further, the signature map 2510 may be the same signature map 2510 used by the embodiments described with respect to system 2500. The template file 2516 may also be the same template file 2516 as already described with respect to system 2500.

Figure 28:
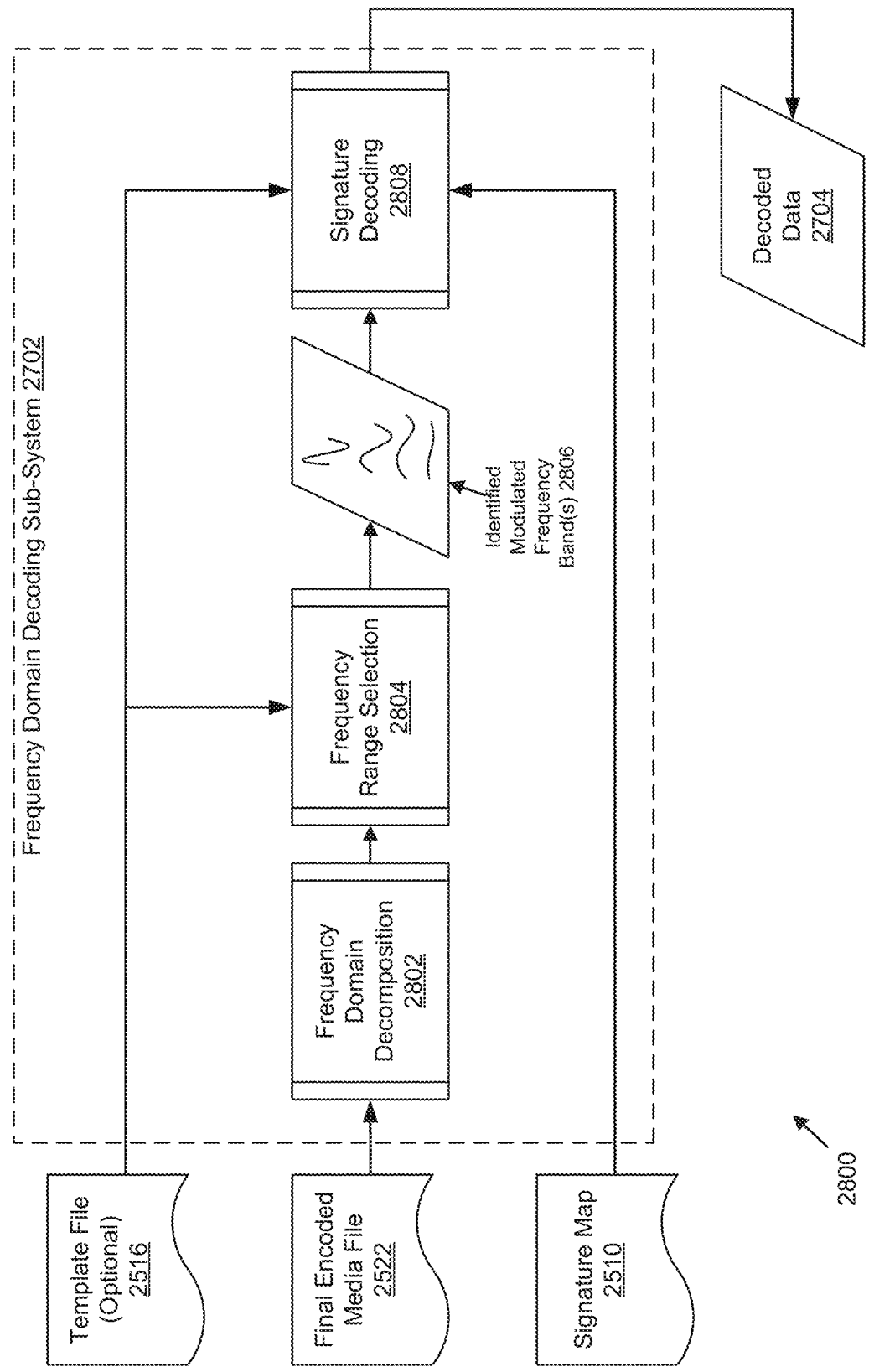
FIG. 28 is an illustration of a system used when decoding data according to an embodiment.

In the embodiment depicted in system 2700, the signature map 2510, and a final encoded media file 2522 are used in a frequency domain decoding sub-system 2702. frequency domain decoding sub-system 2702 can be described with reference to system 2800 in FIG. 28. In some embodiments, a template file 2516 can also be used by the frequency domain decoding sub-system 2702.

System 2800 is an illustration of a system used when decoding data according to an embodiment.

The frequency domain decomposition 2802 sub-system performs similarly to the frequency domain decomposition sub-system already described with respect to system 2600. Thus, the same descriptions can be incorporated for the frequency domain decomposition 2802 sub-system used in system 2800. The frequency domain decomposition 2802 is used to obtain a frequency domain representation of at least one region of a final encoded media file 2522. In an embodiment, the frequency domain decomposition 2802 sub-system uses at least a final encoded media file 2522 and a signature map 2510 in order to obtain a frequency domain representation of the final encoded media file 2522 or one or more regions of the final encoded media file 2522 (e.g., image) which are known to carry the transcoded data. In an embodiment, a region may encompass the entire final encoded media file 2522 or may be a subset of the final encoded media file 2522.

In an embodiment, the frequency domain decomposition 2802 may be done by the device that was the recipient of the encoded media file 2522. In an embodiment, the frequency domain decomposition 2802 may be carried out by a computing service. Regions of an encoded media file 2522 to be subjected to frequency domain decomposition 2802 may be known by the second device due to a predefined set of regions known to carry data. In an embodiment, the regions that are carrying transcoded data are indicated by data contained with the packets received during, before, or after the packets that carry the data of the final encoded media file 2522. In an embodiment, the indication of which regions of a final encoded media file 2522 (e.g., image) carry transcoded data is stored in a remote server (e.g., computing service) to be obtained by the device that is decoding a final encoded media file 2522. In an embodiment, the frequency domain decomposition 2802 occurs on the same device as a frequency range selection 2804 process. In an embodiment, the frequency domain decomposition 2802 process occurs on a device that is different from the device that received the final encoded media file 2522.

A frequency range selection 2804 system can be used to identify one or more frequency bands that have been modulated during the encoding of the final encoded media file 2522. Thus, the methods and details of performing frequency range selection that have been described with respect to system 2600 are also applicable to the frequency range selection 2804 performed during decoding. Further, in an embodiment, the methods used during frequency range selection 2804 while decoding a final encoded media file 2522 may be dependent on the frequency range selection criteria that were used during the encoding process of the final encoded media file 2522. Thus, in an embodiment, the same frequency range selection algorithm is used during frequency range selection while encoding clear data into a final encoded media file 2522 using a template file may be used during decoding, to obtain the same frequency bands containing a signature representation of encoded clear data, preprocessed data, and/or encrypted data. Therefore, it is possible to use a template file 2516 in a similar manner (e.g., using the same frequency range selection algorithm) as a template file was used during an encoding process (e.g., as described in system 2600) to identify the frequency bands 2806 that would have been modulated during encoding.

In an embodiment, a template file 2516 may be used during frequency range selection 2804. In an embodiment, the template file 2516 may be used during frequency range selection 2804 in the decoding system to ensure that the same algorithm is applied to the same template file 2516 as was used during the encoding process of the final encoded media file 2522. In an embodiment, the template file 2516 may always be used during frequency range selection 2804. In an embodiment, the template file 2516 may be used when a condition indicates that the frequency domain decomposition 2802 is not enough, on its own, to help accurately identify modulated frequency bands 2806 (e.g., modulated frequency bands) of the encoded media file 2522. In an embodiment, the template file 2516 is used during the frequency range selection 2804 in the decoding process as a way to confirm the identified modulated frequency bands 2806 derived from the frequency domain decomposition 2802 during decoding are the same as would have been identified during encoding. In an embodiment, instead of using a template file 2516, the identified modulated frequency bands 2806 that were modulated are already stored by the device carrying out the frequency range selection 2804 or a different device that is accessible to the device carrying out the frequency range selection 2804. Such embodiments may be useful to reduce the processing power and time needed for decoding the final encoded media 2522 file. For example, in an embodiment, when a final encoded media file 2522 is obtained, an identification of the modulated frequency bands 2806 within the frequency domain representation is additionally obtained so that frequency range selection 2804 processing may be reduced during decoding.

Block 2806 is representative of the identified modulated frequency bands 2806 identified by the frequency range selection 2804 process.

The signature decoding system 2808 is capable of using the identified modulated frequency bands 2806 along with a signature map 2510 to generate decoded data 2704. In an embodiment, the signature decoding 2808 system is capable of processing each set of amplitudes that represent a signature to identify the character that is represented by each signature. Thus, in an embodiment, the signature decoding 2808 behaves in a reversed fashion of the signature mapping that takes place during encoding (e.g., signature encoding in system, 2500), taking identified modulated frequency bands 2806 and represented signatures, to produce characters (e.g., characters represent clear data, characters represent encrypted data, etc.). In an embodiment, the methods used during signature decoding 2808 depend on the modulation function used during encoding (for example, the same modulation function may be used during decoding and encoding processes).

Because in an embodiment, the modulation functions used during encoding influence how signature decoding 2808 is performed, one of ordinary skill in the art would realize there are various ways in which information about the modulation function used during encoding can be obtained by the device performing signature decoding 2808. For example, the modulation functions used during encoding, or an identifier of the functions, may be sent to the same recipient before, during, or after the final encoded media file is sent. In an embodiment, the modulation functions, or an identifier of the functions, is stored by a computing service (e.g., cloud server) so that the device performing the signature decoding 2808 can access the stored information to determine the modulation function that was used during encoding. In an embodiment, the template file 2516 is used by the device that is performing the signature decoding 2808, or another device, so that either of the devices may then determine how the modulation function would have been chosen during encoding. Further, in an embodiment, information, in addition to, the template file 2516 is used to help determine the modulation function that was used during the encoding of the final encoded media file 2522, such as application requirements of an application on the device that was sending the final encoded media file 2522, the application used to create the final encoded media file 2522, and/or the application that is used to receive the final encoded media file 2522.

In an embodiment, one of three approaches is used by the signature decoding 2808 system to determine the alphabet characters that are represented by a signature, three possible approaches being a direct approach, a probabilistic approach, and a machine learning approach. Correspondingly, in an embodiment, a direct approach is used where a signature is retrieved from a set of amplitudes and compared with existing signatures in the alphabet to see if the retrieved signature matches a signature that exists in the alphabet (so the corresponding character for the signature can then be obtained using the signature map 2510. In an embodiment where a probabilistic approach is used, a probability value is assigned to each signature in the alphabet based on the similarities it has with a signature retrieved from a set of amplitudes. The signature in the alphabet most similar to the retrieved signature may then be used for determining the corresponding alphabet character. In an embodiment where the machine learning approach is used, machine learning models may be used to recognize similarities between the retrieved signature and signatures in the alphabet. In an embodiment, a combination of the direct, probabilistic, and machine learning-based approach is used.

After signature decoding 2808 has occurred and the signatures have been mapped to corresponding characters, the characters are shown as decoded data 2704.

Looking again to system 2700, decoded data 2704 obtained from the frequency domain decoding sub-system 2712 may be subjected to a character data postprocessing system 2706. In an embodiment, character data postprocessing 2706 is performed if any redundancy, error correction techniques, etc. were used during the encoding of the final encoded media file 2522 (e.g., during data preprocessing in system 2500).

In an embodiment, after character data postprocessing 2706 occurs, data decryption 2708 may occur, if the encoded clear data 2710 was encrypted before data preprocessing, to decrypt (using data decryption 2708) and obtain the clear data 2710. In an embodiment, the data decryption 2708 occurs before character data postprocessing 2706 (e.g., on the decoded data 2704). In an embodiment, data decryption 2708 may occur multiple times, if data was encrypted multiple times during encoding (e.g., clear data was encrypted and then the preprocessed data was encrypted, clear data was encrypted and then the final encoded media file was encrypted, etc.).

In an embodiment, the decoded data 2704 had not gone through any preprocessing during encoding and is in clear data 2710 form, therefore no character data postprocessing 2706 is necessary. In an embodiment, clear data 2710 is not obtained until after the decoded data 2704 is subjected to character data postprocessing 2706. In an embodiment, clear data 2710 is not obtained until after decoded data 2704 is decrypted, without character data postprocessing 2706. In an embodiment, clear data 2710 is not obtained until after decoded data 2704 is decrypted by data decryption 2708, with requisite character data postprocessing 2706. One of ordinary skill in the art with the benefit of the present disclosure would recognize that many combinations exist as to whether character data postprocessing 2706 and data decryption 2708 are necessary to obtain clear data 2710 from the decoded data 2704.

Figure 29:
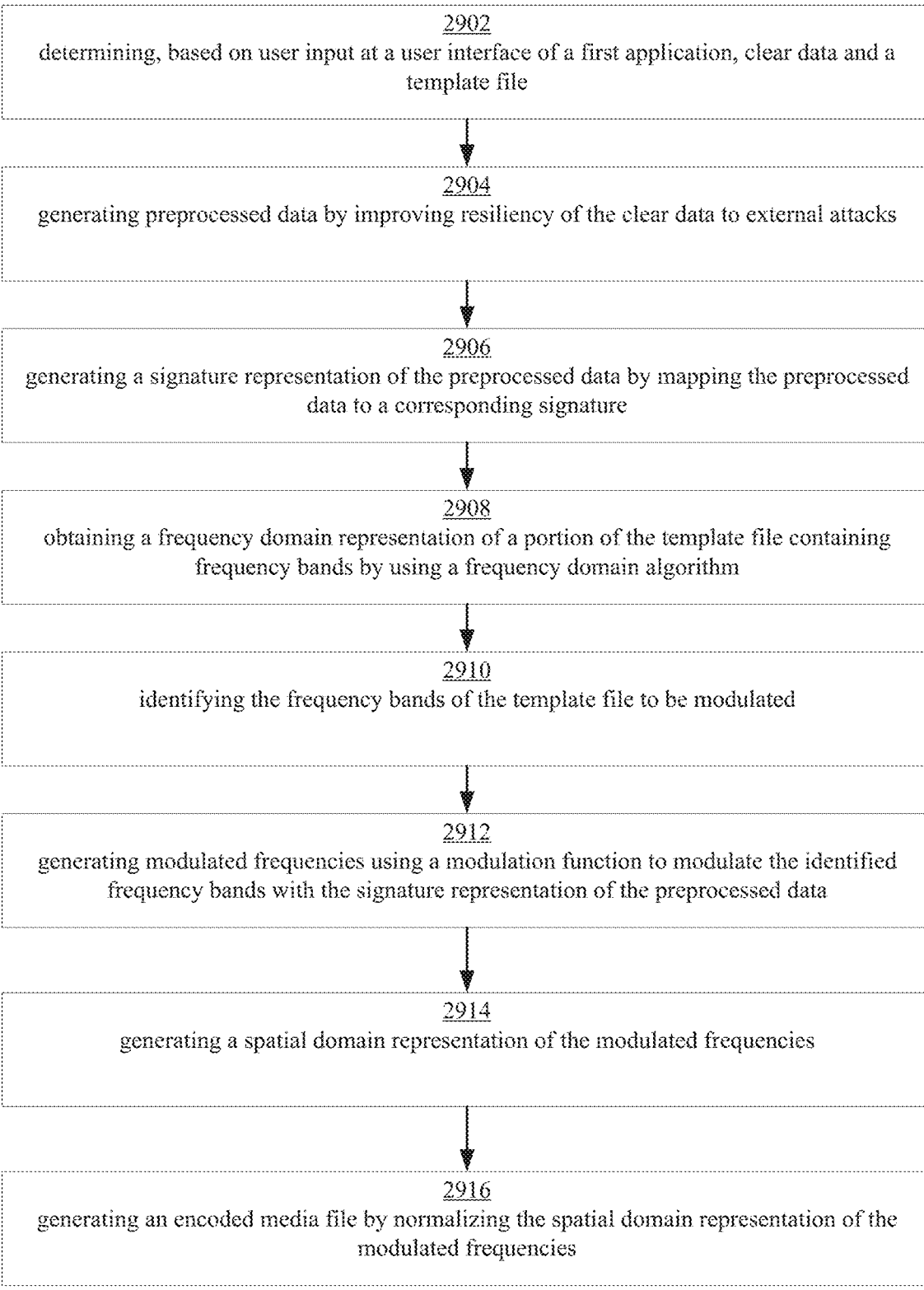
FIG. 29 is a flowchart of a method for encoding data, according to an embodiment.

FIG. 29 is a flowchart of a method for encoding data, according to an embodiment.

At step 2902, the method determines, based on user input at a user interface of a first application, clear data and a template file. In an embodiment, the clear data is a file (e.g., text file, image, video, sounds) to be encoded into the template file. In an embodiment, the template file (e.g., a file that represents an image, a video, a GIF, audio, etc.) has visual and/or audible properties. In an example embodiment illustrated in system 2500, the clear data is represented by clear data 2502 and the template file is represented by template file 2516.

At step 2904 (e.g., data preprocessing 2506 in system 2500), the method generates preprocessed data by improving resiliency of the clear data to external attacks. In an embodiment, this step is not performed before continuing the encoding process. In an embodiment, this step is optional and therefore relies on a condition being satisfied before it is performed (e.g., user input indicating performance of preprocessing is desired, the user device sending the message from within a certain country, certain file type being sent, the application that will be used to send the final encoded media file, etc.).

At step 2906, the method generates a signature representation of the preprocessed data by mapping the preprocessed data to a corresponding signature. In an example embodiment, this step is performed by the signature mapping 2508 system in system 2500.

At step 2908, the method continues by obtaining a frequency domain representation of a portion of the template file containing frequency bands by using a frequency domain algorithm. For example, this step is performed by the frequency domain decomposition 2602 system in system 2600.

At step 2910, frequency bands of the template file to be modulated are identified (e.g., during frequency range selection 2604 in system 2600).

Step 2912 of the method further comprises generating modulated frequencies (e.g., performed by the amplitude modulation system 2608 in system 2600) using a modulation function to modulate the identified frequency bands with the signature representation of the preprocessed data.

Step 2914 of the method further comprises generating a spatial domain representation of the modulated frequencies (e.g., performed by the inverse frequency domain (FD) 2612 system in system 2600.

Step 2916 of the method further comprises generating an encoded media file by normalizing the spatial domain representation of the modulated frequencies. In an embodiment, the postprocessing 2614 system of system 2600 comprises normalizing the spatial domain representation of the modulated frequencies.

Figure 30:
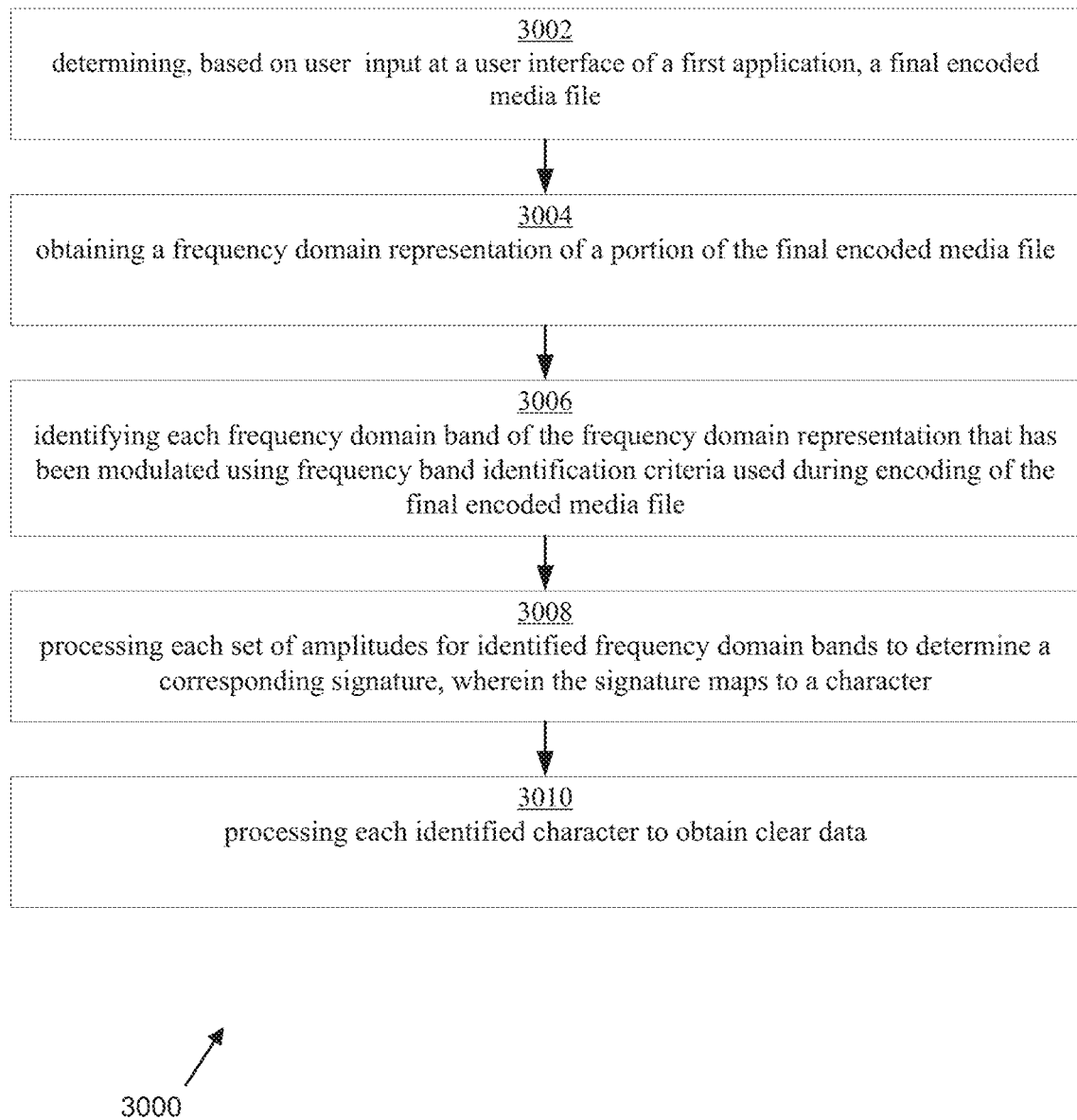
FIG. 30 is a flowchart of a method for decoding data, according to an embodiment.

FIG. 30 is a flowchart of a method for decoding data, according to an embodiment. Instructions for decoding data and/or information used in the decoding of data may be stored in secure memory and/or where cryptographic keys may be stored.

At step 3002, the method comprises determining, based on user input at a user interface of a first application, a final encoded media file. In an example, the final encoded media file 2522 is produced by the encoding system illustrated in system 2500. In an example the final encoded media file is the final encoded media file 2522 illustrated in example system 2700.

At step 3004, the method further comprises obtaining a frequency domain representation of a portion of the final encoded media file (e.g., using the frequency domain decomposition 2802 system of example system 2800).

At step 3006, the method further comprises identifying each frequency domain band of the frequency domain representation that has been modulated using frequency band identification criteria used during encoding of the final encoded media file. In an example, step 3006 may be performed by the frequency range selection 2804 system of system 2800.

At step 3008, the method further comprises processing each set of amplitudes for identified frequency domain bands to determine a corresponding signature, wherein the signature maps to a character. In an example, step 3008 is performed by the signature decoding 2808 system of system 2800.

At step 3010, the method further comprises processing each identified character to obtain clear data. In an embodiment, this step may be performed by any combination of the character data postprocessing 2706 system, the data decryption 2708 system, and/or the signature decoding 2808 system to obtain clear data 2710. That is to say, once signature decoding occurs in step 3010 (e.g., signature decoding 2808 system of 2800), the data obtained may be in clear data format, or may require postprocessing and/or decryption on the data obtained before clear data is obtained.

Below is an additional exemplary integration of Arebus for use with existing smart phone, desktop, and/or personal digital assistant devices. Accordingly, an end User (User A) opts into Arebus and signs on using a username and password. Arebus becomes prevalent of the end User's existing social media and/or email services and integrates into the contact list(s) existing on the social media and/or email services. One or more potential recipients (User B(s)) are selected from the contacts list(s) existing on the end User's existing social media and/or email service and acts as the base for permissions management. Once one or more recipient(s) are identified, then User A selects the data to be sent to the receiving user, and Arebus incorporates security/transcoding prior to handing the data off to the existing social media and/or email service. At the time of encryption/transcoding the data, Arebus assigns permissions, based on User A's directives, for use/viewing/restrictions of the data by User B(s). The transcoded message(s) is then sent to User B(s) where they are detranscoded and decrypted to the original Clear Data assuming User B(s) are authorized based on their assigned permissions.

The example methods, systems, and applications, described above, support privacy controls for messaging and storage of pictures/videos on desktop and mobile devices. These example methods, systems and applications operate to protect email, text, business, and social media messaging (e.g., Slack, Facebook, Signal, Viber, Telegram, etc.) as well as to allow an end user to take their files (including picture/videos) and store them locally and on online services (e.g., Google Drive, Dropbox, a social media feed, etc.) encrypted in existing "camera roll," gallery, or native application specific storage of the electronic device. The example methods, systems and applications operate to solve the data at rest issue (people accessing your online accounts or stealing your phone, getting sensitive messages and pictures) and data in transit (messages and pictures being intercepted while being sent through a service).

In addition, for consumers, the example methods, systems, and applications operate to protect online content for social media (Facebook wall post, Google+, Tumblr, etc.). The example methods, systems, and applications enable the ultimate online content control and kill switch if desired, placing control of data on the electronic device in the user's hands if the device is stolen or misplaced.

Referring now to the hardware/software components supportive of Arebus, below is an exemplary disclosure of a computer operable system to execute the disclosed Arebus architecture. In order to provide additional context for various aspects of the described embodiments, the following discussion are intended to provide a brief, general description of a suitable computing environment in which the various aspects of the described embodiments can be implemented. While the described embodiments have been described above in the general context of computer-executable instructions and algorithms that may run on one or more computers, those skilled in the art will recognize that the described embodiments can also be implemented in combination with other program modules and/or as a combination of hardware (see the hardware in FIG. 16) and software.

Generally, program modules include routines, programs, components, data structures, etc., that perform particular tasks or implement particular abstract data types. Moreover, those skilled in the art will appreciate that the example methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The described aspects of the embodiments may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information, and which can be accessed by the computer.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

An exemplary environment for implementing various aspects of the embodiments requires a computer, the computer including a processing unit, a system memory, and a system bus. The system bus couples system components including, but not limited to, the system memory to the processing unit. The processing unit can be any of various commercially available processors. Dual microprocessors and other multiprocessor architectures may also be employed as the processing unit.

The system bus can be any of several types of bus structure that may further interconnect to a memory bus (with or without a memory controller), a peripheral bus, and a local bus using any of a variety of commercially available bus architectures. The system memory includes read only memory (ROM) and random-access memory (RAM). A basic input/output system (BIOS) is stored in a non-volatile memory such as ROM, EPROM, EEPROM, which BIOS contains the basic routines that help to transfer information between elements within the computer, such as during start-up. The RAM can also include a high-speed RAM such as static RAM for caching data.

The computer further may include an internal hard disk drive (HDD) (e.g., EIDE, SATA), which internal hard disk drive may also be configured for external use in a suitable chassis (not shown), a magnetic floppy disk drive (FDD), (e.g., to read from or write to a removable diskette and an optical disk drive, (e.g., reading a CD-ROM disk or, to read from or write to other high capacity optical media such as the DVD). The hard disk drive, magnetic disk drive and optical disk drive can be connected to the system bus by a hard disk drive interface, a magnetic disk drive interface, and an optical drive interface, respectively. The interface for external drive implementations includes at least one or both of Universal Serial Bus (USB) and IEEE interface technologies.

The drives and their associated computer-readable media provide nonvolatile storage of data, data structures, computer-executable instructions, and so forth. For the computer, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the described embodiments.

A number of program modules can be stored in the drives and RAM, including an operating system, one or more application programs, other program modules and program data. All or portions of the operating system, applications, modules, and/or data can also be cached in the RAM. It is appreciated that the described embodiments can be implemented with various commercially available operating systems or combinations of operating systems.

A user (User A, B, C . . . ∞) can enter commands and information into the computer through one or more wired/wireless input devices, e.g., a keyboard and a pointing device, such as a mouse. Other input devices (not shown) may include a microphone, an IR remote control, a joystick, a game pad, a stylus pen, a touch screen, or the like. These and other input devices are often connected to the processing unit through an input device interface that is coupled to the system bus, but can be connected by other interfaces, such as a parallel port, an IEEE 1394 serial port, a game port, a USB port, an IR interface, etc.

A monitor or other type of display device is also connected to the system bus via an interface, such as a video adapter. In addition to the monitor, a computer typically includes other peripheral output devices (not shown), such as speakers, printers, etc. The computer may operate in a networked environment using logical connections via wired and/or wireless communications to one or more remote computers, such as a remote computer(s). The remote computer(s) can be a workstation, a server computer, a router, a personal computer, portable computer, microprocessor-based entertainment appliance, a peer device or other common network node, and typically includes many or all of the elements described relative to the computer, although, for purposes of brevity, only a memory storage device is illustrated. The logical connections depicted include wired/wireless connectivity to a local area network (LAN) and/or larger networks, e.g., a wide area network (WAN). Such LAN and WAN networking environments are commonplace in offices, and companies, and facilitate enterprise-wide computer networks, such as intranets, all of which may connect to a global communication network, e.g., the Internet.

When used in a LAN networking environment, the computer is connected to the local network through a wired and/or wireless communication network interface or adapter. The adaptor may facilitate wired or wireless communication to the LAN, which may also include a wireless access point disposed thereon for communicating with the wireless adaptor. When used in a WAN networking environment, the computer can include a modem, or is connected to a communications server on the WAN, or has other means for establishing communications over the WAN, such as by way of the Internet. The modem, which can be internal or external and a wired or wireless device, is connected to the system bus via the serial port interface. In a networked environment, program modules depicted relative to the computer, or portions thereof, can be stored in the remote memory/storage device. It will be appreciated that the network connections shown are exemplary and other means of establishing a communications link between the computers can be used.

The computer may be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Furthermore, a second exemplary computing environment in accordance with the described embodiments may include one or more client(s). The client(s) can be hardware and/or software (e.g., threads, processes, computing devices). The client(s) can house cookie(s) and/or associated contextual information by employing the described embodiments, for example. The system also includes one or more server(s). The server(s) can also be hardware and/or software (e.g., threads, processes, computing devices). The servers can house threads to perform transformations by employing the described embodiments, for example. One possible communication between a client and a server can be in the form of a data packet adapted to be transmitted between two or more computer processes. The data packet may include a cookie and/or associated contextual information, for example. The system includes a communication framework (e.g., a global communication network such as the Internet) that can be employed to facilitate communications between the client(s) and the server(s).

Communications can be facilitated via a wired (including optical fiber) and/or wireless technology. The client(s) are operatively connected to one or more client data store(s) that can be employed to store information local to the client(s) (e.g., cookie(s) and/or associated contextual information). Similarly, the server(s) are operatively connected to one or more server data store(s) that can be employed to store information local to the servers.

What has been disclosed above includes exemplary uses of the described embodiments. It is, of course, not possible to describe every conceivable combination of elements and/or methodologies for purposes of describing the embodiments, but one of ordinary skill in the art may recognize that many further combinations and permutations of the embodiments are possible. Accordingly, the described embodiments are intended to embrace all such alterations, modifications and variations that fall within the spirit and scope of the disclosure and associated Figures. Furthermore, to the extent that the term "includes" is used in either the detailed description or the specification, such term is intended to be inclusive in a manner similar to the term "comprising" as "comprising" is interpreted when employed as a transitional word.

In addition to those features described above, the embodiments may also have the following features: Business Management UI: A User Interface focused on the needs of the Businesses that use, or integrate with, the system. Most likely this will include some level of API management tools.

Consumer UI: A User Interface focused on the needs of the end consumer that use the system.

Management Bus: Allows all services and UI's to communicate through a universal communication bus. It provides a standardized API for all inter-process communication as well as guaranteed delivery of communications.

ACL: As already described, the ACL contains multiple functions, including identity management as well as rules for object and user interaction, traditional access control list functionality, address book functionality, knowledge of pathing, information that other services need related to what functions are allowed and how they are to be configured or tuned. It may contain any form of rule (business rule) for manipulating, storing, transmitting and transforming data. This is the central database for most of the organizational functions of the system as a whole.

Cron: A service that controls all time-based functions of the system. For example, timing of encryption key expiry, events based on time cadence, timed housekeeping activities, etc.

Analytics and Reporting: A report of the massive web of data and relationships between users.

Identities & Keys: Contains multiple functions, including cryptographic identity and cryptographic key management for the purposes of encryption.

Event Processing: Complex event structures based on system level needs or the needs of the users of the system are processed. Pattern Recognition: The system finds and tracks patterns in users' connections, metadata, transmission patterns, etc.

Transformations: Transforming of data into formats that are almost universally transmittable.

Encryption: Controls all forms of encryption based on input from the Identity and Key management systems including the ACL system. This may include multiple symmetric key cryptography algorithms, as well as multiple asymmetric key cryptography implementations.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim.

What is claimed is:

1. A computer-implemented method comprising:
    determining clear data from one or more input files that include a first file; and
    generating a second file, which is user-recognizable as an audio and/or visual file, by transcoding the clear data into transcoded data using at least one encoding domain, wherein the transcoded data within the second file is no longer user-recognizable as the clear data, wherein transcoding the clear data comprises:
        determining presentation properties for generating the second file according to presentation elements;
        determining a mapping associated with the at least one encoding domain, the mapping indicating how the presentation elements are to be generated based on values of the clear data, wherein the mapping renders the clear data to be no longer user-recognizable from the second file;

generating the presentation elements representing the clear data values of the clear data; and generating the transcoded data of the second file by combining, based on the presentation properties, the presentation elements such that, upon a presentation of the second file at a user interface, the transcoded data is audibly and/or visually user-recognizable based on the presentation properties.

2. The method of claim 1, wherein the at least one encoding domain includes one or more of a spatial domain or a frequency domain.

3. The method of claim 1, wherein the at least one encoding domain includes a frequency domain, and wherein the computer-implemented method further comprises:
   determining a template file for the transcoding; and
   generating, based on the mapping, a frequency domain representation of template file in the frequency domain, wherein the presentation elements are generated based on the frequency domain representation.

4. The method of claim 1, further comprising:
   applying a color quantization algorithm to the second file.

5. The method of claim 1, further comprising:
   reiterating encoding steps using the second file to generate a corrected file or performing a channel adjustment of the second file for one or more channels that have not been used for transcoding, wherein the channel adjustment is performed when the second file has a low fidelity.

6. The method of claim 5, wherein the encoding steps comprise the determining the presentation properties, said determining the mapping, said generating the presentation elements, and said generating the transcoded data.

7. The method of claim 1, wherein the presentation elements are generated using encrypted values of the clear data, preprocessed values of the clear data, preprocessed values of the encrypted values of the clear data, and/or encrypted values of the preprocessed values of the clear data.

8. The method of claim 7, wherein the preprocessed values of the clear data are generated at least by adding one or more redundancies and/or error correction codes to the clear data.

9. The method of claim 1, wherein the mapping maps characters to signatures, wherein a character represents binary data that corresponds to a portion of the clear data, and wherein a signature corresponds to a presentation element to be used in generating the second file.

10. The method of claim 1, wherein the at least one encoding domain includes a frequency domain, and wherein the computer-implemented method further comprises:
    determining a template file for the transcoding; and
    generating, by using one or more pixel channels, a frequency domain representation of template file in the frequency domain.

11. The method of claim 1, wherein the at least one encoding domain includes a frequency domain, and wherein the computer-implemented method further comprises:
    determining a template file for the transcoding; and
    generating, a frequency domain representation of template file in the frequency domain by using a frequency domain algorithm, the frequency domain algorithm being selected from a set of frequency domain algorithms based on an application being used to send the second file.

12. The method of claim 1, wherein the at least one encoding domain includes a frequency domain, and wherein the computer-implemented method further comprises:
    determining a template file for the transcoding; and
    generating, a frequency domain representation of template file in the frequency domain by identifying frequency bands of the frequency domain representation of the template file to be modulated, the identification based on a pseudo-random, predefined, or adaptive decision.

13. The method of claim 12, wherein the decision is based on image quality and/or data resilience.

14. The method of claim 12, wherein the adaptive decision is based on a machine learning model, wherein the machine learning model has been trained to determine frequency bands for modulation.

15. The method of claim 12, wherein the frequency domain representation is representative of modulated frequencies, wherein the modulated frequencies are generated using at least the identified frequency bands, the presentation elements, and an amplitude modulation function.

16. The method of claim 15, wherein the amplitude modulation function is predefined or based on a machine learning model, wherein the machine learning model has been trained to determine a modulation function.

17. The method of claim 15, wherein the amplitude modulation function used is based on an application being used to send the second file.

18. The method of claim 1, wherein the transcoded data of the second file is normalized using a floating point data type or by rounding floating point values to integers.

* * * * *